United States Patent
Takagi et al.

(10) Patent No.: US 6,762,853 B1
(45) Date of Patent: Jul. 13, 2004

(54) IMAGE PROCESSING SYSTEM

(75) Inventors: Shiro Takagi, Inagi (JP); Kazuhiro Ogura, Kawasaki (JP); Nobuhisa Yoda, Kamakura (JP); Kazuaki Kidokoro, Yokohama (JP); Tatsuya Haraguchi, Yokohama (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/527,465

(22) Filed: Mar. 17, 2000

(30) Foreign Application Priority Data

May 27, 1999 (JP) ............................................ 11-148673

(51) Int. Cl.[7] ............................. G06F 15/00; G06K 1/00
(52) U.S. Cl. ...................... 358/1.15; 358/1.13; 358/1.1; 358/1.9
(58) Field of Search ............................... 358/1.15, 1.13, 358/1.1, 1.9

(56) References Cited

U.S. PATENT DOCUMENTS

| | | | | |
|---|---|---|---|---|
| 5,657,463 A | * | 8/1997 | Bingham | 345/799 |
| 5,699,494 A | * | 12/1997 | Colbert et al. | 358/1.15 |
| 5,757,468 A | * | 5/1998 | Patton et al. | 355/40 |
| 6,166,826 A | * | 12/2000 | Yokoyama | 358/1.16 |

FOREIGN PATENT DOCUMENTS

| | | | |
|---|---|---|---|
| JP | 7-319652 | 12/1995 | |
| JP | 10187385 | * 12/1996 | G06F/3/12 |
| JP | 10-111793 | 4/1998 | |

* cited by examiner

Primary Examiner—Kimberly Williams
Assistant Examiner—Ashanti Ghee
(74) Attorney, Agent, or Firm—Foley & Lardner LLP

(57) ABSTRACT

In this invention, a function is added to a digital copying machine or a function of the digital copying machine is changed from a remote terminal by using a window image displayed on an operation unit of the digital copying machine. This allows an operator of the remote terminal to check the arrangement and shapes of actual operation buttons by which functions are displayed on the operation unit. It is possible to avoid choosing a wrong icon for assigning or changing a function and present changes of functions readily understandable by an operator.

2 Claims, 49 Drawing Sheets

| MANAGEMENT UTILITY | | NORMAL | ON-LINE | | | | |
|---|---|---|---|---|---|---|---|
| SYSTEM CONFIGURATION | PRINT JOB | SCANNER JOB | PRINTER INFORMATION | ACCESS BUTTON EDIT | MANAGER | | COMPLETE |

ACCESS BUTTON EDIT

ACCESS BUTTON LIST (ONLY REFERENCE)

| NUMBER | FRAME NAME | CREATOR | COUNTER |
|---|---|---|---|
| 001 | COMMON | GENERAL AFFAIRS DEPARTMENT | 10 |

| 1 | ✉ | INFORMATION | 2 | 🗄 | NEWLY ARRIVED BOOKS |  |
|---|---|---|---|---|---|---|
| 3 | — | — | 4 | — | — | |
| 5 | — | — | 6 | — | — |  |

RETURN

PRIVATE SCAN
SELECT FRAME

FRAME NUMBER  003

PASSWORD  ****

CANCEL          SET

FIG. 6

FRAME NAME 003 OGURA (PRIVATE SCAN)

✉ TRANSMIT TO
PARTIES CONCERNED

CANCEL

FIG. 7

SELECT PRIVATE PRINT USER

| USER NAME | TAKAHASHI ▽ |
|---|---|
| PASSWORD | * * * * |

[ CANCEL ]  [ SET ]

FIG. 8

PRIVATE PRINT LIST

| NO | DOCUMENT NAME |
|---|---|
| 1 | 05/06  13:41   REPORT |
| 2 | 05/06  13:50   WORK CONTENTS |
| 3 | 05/06  14:00   SALES REPORT |

[ CANCEL ]  [ DELETE ]  [ PRINT ]

FIG. 9

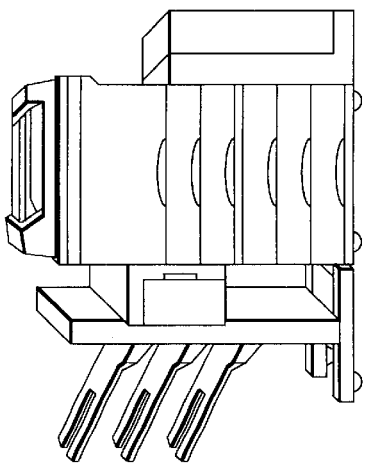

| MANAGEMENT UTILITY | PRINT JOB | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

SYSTEM CONFIGURATION

| INSTALLATION LOCATION | | MANAGER | |
|---|---|---|---|
| HEAD OFFICE | | TOSHIBA TECH | |

ATTACHED DEVICES

| DEVICE | | SETTING |
|---|---|---|
| UPPER CASSETTE | | A4-R |
| LOWER CASSETTE | | B4 |
| LARGE-CAPACITY PAPER FEED TRAY (OPTION) | | A4 |
| THREE-STAGE SHEET FEEDER (OPTION) | UPPER | A4-R |
| | MIDDLE | B4 |
| | LOWER | B5 |
| AUTOMATIC DOUBLE-SIDED ORIGINAL FEEDER (OPTION) | | ATTACHED |
| AUTOMATIC DOUBLE-SIDED UNIT (OPTION) | | ATTACHED |
| FINISHER (OPTION) | | ATTACHED |

VERSION INFORMATION

| MAIN BODY | 1.0 |
|---|---|
| CONTROLLER | 1.0 |
| CONTROL SOFTWARE | 1.0 |

FIG. 10

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

PRINT JOB (PRIVATE)

ENTER USER NAME AND PASSWORD

USER NAME | TAKAHASHI ▷

PASSWORD |

SET

FIG. 11

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

PRINT JOB (PRIVATE)
USER NAME: TAKAHASHI
CHECK PRINT JOB TO BE DELETED

| DELETE | DOCUMENT NAME | ▽RECEPTION DATE | SHEET SIZE | NUMBER OF PAGES | STATUS |
|---|---|---|---|---|---|
| ☑ | REPORT | 05/06 15:00 | A4 | 1 | WAITING FOR PRINTING |
| ☐ | INFORMATION | 05/06 15:15 | A4 | 1 | PRINTING |

DELETE                                    RETURN

FIG. 12

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

PRINT JOB (PRIVATE)
USER NAME: TAKAHASHI
DELETE FOLLOWING PRINT JOB?

| DOCUMENT NAME | ▽RECEPTION DATE | SHEET SIZE | NUMBER OF PAGES | STATUS |
|---|---|---|---|---|
| REPORT | 05/06 15:00 | A4 | 1 | WAITING FOR PRINTING |

DELETE    RETURN

FIG.13

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

SCANNER JOB
ENTER FRAME NAME AND PASSWORD

FRAME NAME | 001 COMMON ▷ |

PASSWORD | |

SET

FIG. 14

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

SCANNER JOB

CHECK SCANNER JOB TO BE DELETED

| DELETE | FRAME NAME | BUTTON NAME | FUNCTION | ▽RECEPTION DATE | SHEET SIZE | STATUS | EXPLANATION |
|---|---|---|---|---|---|---|---|
| ☑ | 001 COMMON | INFORMATION | MAIL | 05/06 13:50 | 1 | WAITING FOR PROCESSING | |
| ☐ | 001 COMMON | NEWLY ARRIVED BOOKS | DB | 05/06 14:00 | 1 | WAITING FOR PROCESSING | |
| ☐ | 003 OGURA | TRANSMIT TO PARTIES CONCERNED | MAIL | 05/06 14:10 | 2 | PROCESSING | RETRYING |

DELETE                                          RETURN

FIG. 15

| MANAGEMENT UTILITY | | NORMAL | ON-LINE | | |
|---|---|---|---|---|---|
| SYSTEM CONFIGURATION | PRINT JOB | SCANNER JOB | PRINTER INFORMATION | ACCESS BUTTON EDIT | MANAGER | COMPLETE |

SCANNER JOB

DELETE FOLLOWING SCANNER JOB?

| FRAME NAME | BUTTON NAME | FUNCTION | ▽RECEPTION DATE | NUMBER OF PAGES | STATUS | EXPLANATION |
|---|---|---|---|---|---|---|
| 001 COMMON | INFORMATION | MAIL | 05/06 13:50 | 1 | WAITING FOR PROCESSING | |

[DELETE]  [RETURN]

FIG.16

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

PRINTER INFORMATION

PRINTER INFORMATION

BUILT-IN FONT LIST

| FONT SOURCE NUMBER | — |
|---|---|
| FONT NUMBER | 1 |
| DEFAULT FONT PITCH | 10.0Inch |
| FONT SIZE | 12.0point |
| SYMBOL SET NUMBER | ROMAN |
| NUMBER OF LINES PER PAGE | — |
| NUMBER OF COPIES | 1 |
| SHEET SIZE | A4 |
| SHEET DIRECTION | LONGITUDINAL |
| RESOLUTION | 300dpi |
| CASSETTE | — |
| PAGE DELIVERY ORDER | FORWARD |
| DOUBLE-SIDED PRINTING MODE | — |
| SORT MODE | NONE |
| SHEET DELIVERY BIN | — |
| EMULATION MODE | AUTO |
| FORCED SHEET DELIVERY MODE | — |

RETURN

FIG. 17

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

PRINTER INFORMATION

[PRINTER INFORMATION]

[BUILT-IN FONT LIST]

| EMULATION | BUILT-IN FONTS |
|---|---|
| PCL-6 | DutchTM 801 Roman SWC |
| | Dutch 801 Italic SWC |
| | Dutch 801 Bold SWC |
| | Dutch 801 Bold Italic SWC |
| | SwissTM 742 SWC |
| | Swiss 742 Italic SWC |
| | Swiss 742 Bold SWC |
| | Swiss 742 Bold Italic SWC |
| | Swiss 742 Condensed SWC |
| | Swiss 742 Condensed Italic SWC |
| | Swiss 742 Condensed Bold SWC |
| | Swiss 742 Condensed Bold Italic SWC |
| | Incised 901 SWC |
| | Incised 901 Italic SWC |
| | Incised 901 Bold SWC |
| | Zapf Humanist 601 SWC |
| | Zapf Humanist 601 Italic SWC |
| | Zapf Humanist 601 Bold SWC |
| | Zapf Humanist 601 Bold Italic SWC |

[RETURN]

FIG. 18

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

ACCESS BUTTON EDIT

CLICK FRAME NAME TO BE CHANGED IN SETTINGS

| NUMBER | FRAME NAME | CREATOR |
|---|---|---|
| 001 | COMMON | GENERAL AFFAIRS DEPARTMENT |
| 002 | DESIGN DEPARTMENT | TAKAHASHI |
| 003 | OGURA | OGURA |
| 004 | — | — |
| 005 | — | — |
| 006 | — | — |
| 007 | — | — |
| 008 | — | — |

FIG. 19

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

ACCESS BUTTON EDIT

ENTER PASSWORD FOR EDITING "001: COMMON" FRAME

⦿ ONLY REFERENCE TO ACCESS BUTTON LIST    PASSWORD: [ ]
◯ EDIT ACCESS BUTTON

[ SET ]    [ RETURN ]

FIG. 20

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

ACCESS BUTTON EDIT

ACCESS BUTTON LIST (ONLY REFERENCE)

| NUMBER | FRAME NAME | CREATOR | COUNTER |
|---|---|---|---|
| 001 | COMMON | GENERAL AFFAIRS DEPARTMENT | 10 |

| 1 | ▽ | INFORMATION | 2 | | NEWLY ARRIVED BOOKS |
|---|---|---|---|---|---|
| 3 | — | — | 4 | — | — |
| 5 | — | — | 6 | — | — |

◁  ▷

RETURN

FIG. 21

| MANAGEMENT UTILITY | NORMAL | ON-LINE | | | | COMPLETE |
|---|---|---|---|---|---|---|
| SYSTEM CONFIGURATION | PRINT JOB | SCANNER JOB | PRINTER INFORMATION | ACCESS BUTTON EDIT | MANAGER | |

ACCESS BUTTON EDIT

| NUMBER | FRAME NAME | CREATOR | BUTTON NUMBER | COUNTER |
|---|---|---|---|---|
| 001 | COMMON | GENERAL AFFAIRS DEPARTMENT | 1 | 2 |

| FUNCTION | ASSIGNED FUNCTION | MAIL | | DETAILED DISPLAY |
|---|---|---|---|---|

| DISPLAYED CONTENTS | BUTTON NAME | INFORMATION ▽ | |
|---|---|---|---|
| SCAN SETTINGS | RESOLUTION | 300dpi | |
| | DOUBLE-SIDED SETTING | SINGLE-SIDED | |
| | CHECK PRINT | LIST | |
| | SHEET SIZE | A4 | |
| | MODE | CHARACTER | |
| | DENSITY ADJUSTMENT | AUTO | |
| | ORIGINAL DIRECTION | PORTRAIT | |

RETURN

FIG. 22

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

ACCESS BUTTON EDIT

| NUMBER | FRAME NAME | CREATOR | BUTTON NUMBER | BUTTON NAME |
|---|---|---|---|---|
| 001 | COMMON | GENERAL AFFAIRS DEPARTMENT | 1 | INFORMATION |

ASSIGNED FUNCTION    MAIL

| From | ken@toshiba.co.jp |
|---|---|
| To | miy@toshiba.co.jp |
| Subject | INFORMATION FROM GENERAL AFFAIRS DEPARTMENT |
| MIME | ○ DO NOT DIVIDE<br>◉ DIVIDE    DIVISION SIZE  128  KB |

RETURN

FIG. 23

| MANAGEMENT UTILITY | NORMAL | ON-LINE | | | COMPLETE |
|---|---|---|---|---|---|
| SYSTEM CONFIGURATION | PRINT JOB | SCANNER JOB | PRINTER INFORMATION | ACCESS BUTTON EDIT | MANAGER |

ACCESS BUTTON EDIT

ACCESS BUTTON LIST (EDITABLE)

| NUMBER | FRAME NAME | CREATOR | COUNTER |
|---|---|---|---|
| 001 | COMMON | GENERAL AFFAIRS DEPARTMENT | 10 |

| 1 ✉ INFORMATION | 2 📦 — | NEWLY ARRIVED BOOKS |
|---|---|---|
| 3 — | 4 — | — |
| 5 — | 6 — | — |

SET FRAME NAME

RETURN

FIG. 24

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

ACCESS BUTTON EDIT

CHANGE FRAME SETTINGS

| NUMBER | 001 |
|---|---|
| FRAME NAME | COMMON |
| CREATOR | GENERAL AFFAIRS DEPARTMENT |

| CURRENT PASSWORD | |
| NEW PASSWORD | |
| CONFIRMATION | |

[ SET ]   [ RETURN ]

FIG. 25

| MANAGEMENT UTILITY | | NORMAL | ON-LINE | | | | |
|---|---|---|---|---|---|---|---|
| SYSTEM CONFIGURATION | PRINT JOB | SCANNER JOB | PRINTER INFORMATION | ACCESS BUTTON EDIT | | MANAGER | COMPLETE |

ACCESS BUTTON EDIT

| NUMBER | FRAME NAME | CREATOR | BUTTON NUMBER | BUTTON NAME |
|---|---|---|---|---|
| 001 | COMMON | GENERAL AFFAIRS DEPARTMENT | 2 | NEWLY ARRIVED BOOKS |

ASSIGNED FUNCTION  ○ MAIL  ⊙ DB

| DB SERVER NAME | GENERAL AFFAIRS DEPARTMENT SERVER |
|---|---|
| DB USER NAME | takahashi |
| PASSWORD | **** |
| CLASSIFIED NAME | NEWLY ARRIVED INFORMATION |
| TITLE | BOOKS % DATE % |

SET   RETURN

| MANAGEMENT UTILITY | NORMAL | ON-LINE | | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

ACCESS BUTTON EDIT

| NUMBER | FRAME NAME | CREATOR | BUTTON NUMBER | BUTTON NAME |
|---|---|---|---|---|
| 001 | COMMON | GENERAL AFFAIRS DEPARTMENT | 2 | NEWLY ARRIVED BOOKS |

ASSIGNED FUNCTION:  ◉ MAIL   ○ DB

From

To

Subject

MIME    ○ DO NOT DIVIDE
        ◉ DIVIDE  DIVISION SIZE  128  KB

[ SET ]    [ RETURN ]

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | | MANAGER | COMPLETE |

ACCESS BUTTON EDIT

| NUMBER | FRAME NAME | CREATOR | BUTTON NUMBER |
|---|---|---|---|
| 001 | COMMON | GENERAL AFFAIRS DEPARTMENT | 2 |

DISPLAYED CONTENTS

| BUTTON NAME | NEWLY ARRIVED BOOKS |
|---|---|
| ICON | ○ ✉<br>● 📦<br>○ NEW |

SET　　RETURN

FIG. 29

| MANAGEMENT UTILITY | | NORMAL | ON-LINE | | | | |
|---|---|---|---|---|---|---|---|
| SYSTEM CONFIGURATION | PRINT JOB | SCANNER JOB | PRINTER INFORMATION | ACCESS BUTTON EDIT | MANAGER | | COMPLETE |

ACCESS BUTTON EDIT

| NUMBER | FRAME NAME | CREATOR | BUTTON NUMBER | BUTTON NAME |
|---|---|---|---|---|
| 001 | COMMON | GENERAL AFFAIRS DEPARTMENT | 2 | NEWLY ARRIVED BOOKS |

SCAN SETTINGS

| RESOLUTION | ○200dpi ●300dpi ○400dpi ○600dpi |
|---|---|
| DOUBLE-SIDED SETTING | PRINT ●DOUBLE-SIDED |
| CHECK PRINT | ●EQUAL SIZE ○LIST |
| SHEET SIZE | ○A3 ●A4 ○A4R ○A5R ○B4 ○B5 ○B5R |
| MODE | ○CHARACTER ●STANDARD ○PHOTOGRAPH |
| DENSITY ADJUSTMENT | ●AUTO ○LOW ○MIDDLE ○HIGH |
| ORIGINAL DIRECTION | ●PORTRAIT ○LANDSCAPE |

SET    RETURN

FIG. 30

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

ACCESS BUTTON EDIT

| NUMBER | FRAME NAME | CREATOR | BUTTON NUMBER | BUTTON NAME |
|---|---|---|---|---|
| 001 | COMMON | GENERAL AFFAIRS DEPARTMENT | 2 | NEWLY ARRIVED BOOKS |

CHANGE PASSWORD OF ACCESS BUTTON
(LEAVE NEW PASSWORD BLANK IF YOU DO NOT SET PASSWORD)

| CURRENT PASSWORD | |
|---|---|
| NEW PASSWORD | |
| CONFIRMATION | |

SET    RETURN

FIG. 31

| MANAGEMENT UTILITY | NORMAL | ON-LINE | | |
|---|---|---|---|---|
| SYSTEM CONFIGURATION | PRINT JOB | SCANNER JOB | PRINTER INFORMATION | ACCESS BUTTON EDIT | MANAGER | COMPLETE |

ACCESS BUTTON EDIT

| NUMBER | FRAME NAME | CREATOR |
|---|---|---|
| 001 | OGURA | OGURA |

ENTER PASSWORD

PASSWORD

SET    RETURN

FIG. 32

| MANAGEMENT UTILITY | NORMAL | ON-LINE | | | |
|---|---|---|---|---|---|
| SYSTEM CONFIGURATION | PRINT JOB | SCANNER JOB | PRINTER INFORMATION | ACCESS BUTTON EDIT | MANAGER | COMPLETE |

MANAGER

ENTER PASSWORD

| PASSWORD |

| SET |

FIG. 33

| MANAGEMENT UTILITY | NORMAL | ON-LINE | | | |
|---|---|---|---|---|---|
| SYSTEM CONFIGURATION | PRINT JOB | SCANNER JOB | PRINTER INFORMATION | ACCESS BUTTON EDIT | MANAGER | COMPLETE |

MANAGER

PRINT JOB

PRINT JOB
CHECK PRINT JOB TO BE DELETED

| DELETE | USER NAME | DOCUMENT NAME | RECEPTION DATE | SHEET SIZE | NUMBER OF PAGES | STATUS | TYPE |
|---|---|---|---|---|---|---|---|
| ☑ | TAKAHASHI | REPORT | 05/06 15:00 | A4 | 2 | WAITING FOR PRINTING | NORMAL |
| ☐ | HOSHIYAMA | WEEKLY REPORT | 05/06 15:10 | A4 | 1 | WAITING FOR PRINTING | PRIVATE |
| ☐ | TAKAHASHI | INFORMATION | 05/06 15:15 | A4 | 1 | PRINTING | NORMAL |
| | HOSHIYAMA | REPORT | 05/06 15:20 | A3 | 2 | PRINTING COMPLETE | PRIVATE |
| | HOSHIYAMA | INFORMATION | 05/06 15:30 | B4 | 10 | ERROR | NORMAL |
| ... | ... | ... | ... | ... | ... | ... | ... |

DELETE

SCANNER JOB

AGENT BASIC SETTINGS

NETWORK SETTINGS

PASSWORD SETTINGS

FIG. 34

| MANAGEMENT UTILITY | NORMAL | ON-LINE | | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

MANAGER

PRINT JOB

SCANNER JOB
CHECK SCANNER JOB TO BE DELETED

| DELETE | FRAME NAME | BUTTON NAME | RECEPTION DATE | NUMBER OF PAGES | STATUS | EXPLANATION |
|---|---|---|---|---|---|---|
| ☑ | 001 COMMON | INFORMATION | 05/06 13:50 | 1 | WAITING FOR PRINTING | |
| ☐ | 001 COMMON | NEWLY ARRIVED BOOKS | 05/06 14:00 | 1 | WAITING FOR PRINTING | |
| ☐ | 003 OGURA | TRANSMIT TO PARTIES CONCERNED | 05/06 14:10 | 2 | PRINTING | RETRYING |
| | 003 OGURA | TRANSMIT TO PARTIES CONCERNED | 05/06 14:30 | 4 | ERROR | SIZE OVER |
| | 001 COMMON | INFORMATION | 05/06 15:00 | 1 | COMPLETE | |
| ... | ... | ... | ... | ... | ... | ... |

SCANNER JOB

AGENT BASIC SETTINGS

NETWORK SETTINGS

PASSWORD SETTINGS

[DELETE]

FIG. 35

| MANAGEMENT UTILITY | | NORMAL | ON-LINE | | | |
|---|---|---|---|---|---|---|
| SYSTEM CONFIGURATION | PRINT JOB | SCANNER JOB | PRINTER INFORMATION | ACCESS BUTTON EDIT | MANAGER | COMPLETE |

MANAGER

PRINT JOB

SCANNER JOB

AGENT BASIC SETTINGS

NETWORK SETTINGS

PASSWORD SETTINGS

AGENT BASIC SETTINGS

FUNCTION ● MAIL
○ DB

SMTP SERVER  133.133.20.1

TRANSMISSION SIZE LIMIT  ● DO NOT LIMIT
○ LIMIT TO ☐ KB

SET

FIG. 36

| MANAGEMENT UTILITY | NORMAL | ON-LINE | | | |
|---|---|---|---|---|---|
| SYSTEM CONFIGURATION | PRINT JOB | SCANNER JOB | PRINTER INFORMATION | ACCESS BUTTON EDIT | MANAGER | COMPLETE |

MANAGER

- PRINT JOB
- SCANNER JOB
- AGENT BASIC SETTINGS
- NETWORK SETTINGS
- PASSWORD SETTINGS

AGENT BASIC SETTINGS

FUNCTION: ○ MAIL / ● DB

REGISTRATION SIZE LIMIT: ○ DO NOT LIMIT / ● LIMIT TO 512 KB

SET

FIG. 37

| MANAGEMENT UTILITY | | NORMAL ON-LINE | | | |
|---|---|---|---|---|---|
| SYSTEM CONFIGURATION | PRINT JOB | SCANNER JOB | PRINTER INFORMATION | ACCESS BUTTON EDIT | MANAGER COMPLETE |

MANAGER

PRINT JOB

SCANNER JOB

AGENT BASIC SETTINGS

NETWORK SETTINGS

PASSWORD SETTINGS

NETWORK SETTINGS

| COMPUTER NAME | P001 |
|---|---|
| IP ADDRESS | 133.133.10.2 |
| SUB-NET MASK | 255.255.255.0 |
| DEFAULT GATEWAY | 133.133.10.1 |
| DNS SERVER | 133.133.10.3 |

SET

MANAGER PASSWORD MANAGEMENT TABLE

| PASSWORD |
|---|
| 1234 |

FRAME MANAGEMENT TABLE

| FRAME NUMBER | FRAME NAME | CREATOR | PASSWORD | COUNTER | BUTTON MANAGEMENT TABLE POINTER |
|---|---|---|---|---|---|
| 001 | COMMON | GENERAL AFFAIRS DEPARTMENT | NONE | 10 | |
| 002 | DESIGN DEPARTMENT | TAKAHASHI | 5678 | 2 | |

BUTTON MANAGEMENT TABLE

21c

| BUTTON NUMBER | BUTTON NAME | ICON NUMBER | PASS-WORD | SCANNER SETTINGS | AGENT NUMBER | PARAM-ETERS | COUNTER |
|---|---|---|---|---|---|---|---|
| 1 | INFORMATION | 1 | NONE | A4,··· | 1 | From:··· | 2 |
| 2 | NEWLY ARRIVED BOOKS | 2 | NONE | A4,··· | 2 | SERVER NAME:··· | 1 |

FIG. 40C

ICON MANAGEMENT TABLE

| ICON NUMBER | IMAGE |
|---|---|
| 1 | ✉ |
| 2 | 📚 |

AGENT MANAGEMENT TABLE

| NUMBER | NAME | BASIC SETTING MANAGEMENT TABLE POINTER | INDIVIDUAL SETTING PARAMETER MANAGEMENT TABLE POINTER |
|---|---|---|---|
| 1 | MAIL | | |
| 2 | DB | | |

FIG. 40E

BASIC SETTING MANAGEMENT TABLE

| SMTP SERVER | TRANSMISSION SIZE LIMIT | SIZE |
|---|---|---|
| 133. 133. 20. 1 | DO NOT LIMIT | |

| REGISTRATION SIZE LIMIT | SIZE |
|---|---|
| LIMIT | 512 |

FIG. 40F

INDIVIDUAL SETTING PARAMETER MANAGEMENT TABLE

| From | To | Subject | MIME DIVISION | DIVISION SIZE |
|---|---|---|---|---|
| CHARACTER STRING | CHARACTER STRING | CHARACTER STRING | DIVIDE/ DO NOT DIVIDE | NUMERICAL VALUE |

| DB SERVER NAME | DB SERVER NAME | PASSWORD | CLASSIFIED NAME | TITLE |
|---|---|---|---|---|
| CHARACTER STRING | CHARACTER STRING | PASSWORD | CHARACTER STRING | CHARACTER STRING |

FIG. 40G

PRINT JOB MANAGEMENT TABLE

| NUMBER | USER NAME | DOCUMENT NAME | RECEPTION DATE | SHEET SIZE | NUMBER OF PAGES | STATUS | TYPE | PASS-WORD | IMAGE FILE POINTER |
|---|---|---|---|---|---|---|---|---|---|
| 1 | TAKAHASHI | REPORT | 05/06 15:00 | A4 | 2 | WAITING FOR PRINTING | NORMAL | | |
| 2 | HOSHIYAMA | WEEKLY REPORT | 05/06 15:10 | A4 | 1 | WAITING FOR PRINTING | PRIVATE | 1234 | |
| 3 | TAKAHASHI | INFORMATION | 05/06 15:15 | A4 | 1 | PRINTING | NORMAL | | |
| 4 | HOSHIYAMA | REPORT | 05/06 15:20 | A3 | 2 | PRINTING COMPLETE | PRIVATE | 1234 | |
| 5 | HOSHIYAMA | INFORMATION | 05/06 15:30 | B4 | 10 | ERROR | NORMAL | | |

FIG. 40H

SCANNER JOB MANAGEMENT TABLE

| NUMBER | FRAME NUMBER | BUTTON NUMBER | RECEPTION DATE | NUMBER OF PAGES | STATUS | EXPLANATION | IMAGE FILE POINTER |
|---|---|---|---|---|---|---|---|
| 1 | 001 | 1 | 05/06 13:50 | 1 | WAITING FOR PROCESSING | | |
| 2 | 001 | 2 | 05/06 14:00 | 1 | WAITING FOR PROCESSING | | |
| 3 | 003 | 1 | 05/06 14:10 | 2 | PROCESSING | | |
| 4 | 003 | 1 | 05/06 14:30 | 4 | ERROR | RETRYING | |
| 5 | 001 | 1 | 05/06 15:00 | 1 | COMPLETE | | |

FIG. 40I

NETWORK SETTING MANAGEMENT TABLE

| COMPUTER NAME | IP ADDRESS | SUB-NET MASK | DEFAULT GATEWAY | DNS SERVER |
|---|---|---|---|---|
| P001 | 133.133.10.2 | 255.255.255.0 | 133.133.10.1 | 133.133.10.2 |

FIG. 40J

IMAGE PROCESSING SYSTEM

CROSS-REFERENCE TO RELATED APPLICATIONS

This application is based upon and claims the benefit of priority from the prior Japanese Patent Application No. 11-148673, filed May 27, 1999, the entire contents of which are incorporated herein by reference.

BACKGROUND OF THE INVENTION

The present invention relates to an image processing system comprising an image processor such as a digital copying machine and a remote terminal which is connected to this image processor via a network and manages the operation of the image processor.

Recently, an image processing system has been put into practical use which comprises an image processor such as a digital copying machine and a remote terminal which is connected to this image processor via a network (communication line) and manages the operation of the image processor.

In this system, a user changes the functions and operation windows of the digital copying machine and refers to or changes its operation state from the remote terminal via the network, thereby managing the operation of the machine.

That is, copying machines have changed from analog to digital machines. As described in Jpn. Pat. Appln. KOKAI Publication No. 10-111793, not only a copying function but also a network printer function and a function of transmitting scanned image data to another computer and registering the data in a database DB are combined.

In the above prior art, the function of transmitting scanned image data to another computer to process the data is edited by using a service number and a character string such as the name of an application program to be executed as shown in FIG. 2 of the prior art. Therefore, an operator at the remote terminal cannot check the arrangement and shapes of actual operation buttons by which functions are displayed on an operation unit. Consequently, the operator sometimes selects a wrong icon for assigning or changing a function.

BRIEF SUMMARY OF THE INVENTION

It is an object of the present invention to provide changes of functions readily understandable by an operator at a remote terminal, by which the operator can check the arrangement and shapes of actual operation buttons displayed on an operation unit of an image processor and hence do not select a wrong icon for assigning or changing a function.

According to the present invention, there is provided an image processing system comprising an image processor for processing an image and a remote terminal connected to the image processor via a communication line to manage the operation of the image processor, wherein the remote terminal uses a window having the same form as that for designating a function on the image processor as a window for designating a function of the image processor.

According to the present invention, there is provided an image processing system comprising an image processor for processing an image and a remote terminal connected to the image processor via a communication line to manage the operation of the image processor, wherein the remote terminal uses a window having the same form as that for designating a function on the image processor as a window for designating a function of the image processor and, when various functions of the image processor are to be assigned to icons, common settings of the functions and settings unique to the icons are separately performed.

According to the present invention, there is provided an image processing system comprising an image processor for printing an image and a remote terminal connected to the image processor via a communication line to manage the operation of the image processor, wherein the remote terminal uses a window having the same form as that for designating a function on the image processor as a window for designating a function of the image processor, and the image processing system further comprises first setting means provided in one of the remote terminal and the image processor to set a printing process, second setting means provided in one of the remote terminal and the image processor to set whether the printing process set by the first setting means is normal printing or private printing by which printing is performed by checking a password, storage means provided in the image processor to store the log of each printing process by the image processor on the basis of the contents set by the first and second setting means, and display means provided in one of the remote terminal and the image processor to display information indicating whether a printing process is normal printing or private printing when the log of the printing process stored in the storage means is to be displayed.

According to the present invention, there is provided an image processing system comprising an image processor for processing an image and a remote terminal connected to the image processor via a communication line to manage the operation of the image processor, wherein the remote terminal uses a window having the same form as that for designating a function on the image processor as a window for designating a function of the image processor, and the image processing system further comprises counting means provided in the image processor to count the number of times of use of each frame or icon used on the window for designating a function of the image processor, and display means provided in one of the remote terminal and the image processor to display, when the window for designating a function of the image processor is displayed, the number of times of use, counted by the counting means, of each frame or icon used on the window.

According to the present invention, there is provided an image processing system comprising an image processor for processing an image and a remote terminal connected to the image processor via a communication line to manage the operation of the image processor, wherein the remote terminal uses a window having the same form as that for designating a function on the image processor as a window for designating a function of the image processor, and the image processing system further comprises setting means provided in one of the remote terminal and the image processor to set whether each of various functions corresponding to each frame used on the window for designating a function of the image processor is a common function usable by anybody or a private function requiring checking of a password, determining means provided in one of the remote terminal and the image processor to determine, when a function of the image processor is to be designated, whether the function is a common function or a private function on the basis of the contents set by the setting means, and permitting means provided in one of the remote terminal and the image processor to permit, when the determining means determines that the function is a private function, designation of the function by checking of a password.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4 to 9 are views showing display examples of a liquid crystal display of the digital copying machine;

FIG. 10 is a view showing a window initially displayed when a management utility is activated on an operational management client;

FIGS. 11 to 13 are views showing windows for managing private printing jobs displayed on the operational management client;

FIGS. 14 to 16 are views showing windows for managing scanner jobs displayed on the operational management client;

FIGS. 17 and 18 are views showing windows in a "printer information" function mode displayed on the operational management client;

FIGS. 19 to 32 are views showing windows in an "access button edit" function mode displayed on the operational management client;

FIG. 33 to 39 are views showing windows in a "manager" function mode displayed on the operational management client;

FIG. 40A is a view for explaining the arrangement of a manager password management table;

FIG. 40B is a view for explaining the arrangement of a frame management table;

FIG. 40C is a view for explaining the arrangement of a button management table;

FIG. 40D is a view for explaining the arrangement of an icon management table;

FIG. 40E is a view for explaining the arrangement of an agent management table;

FIG. 40F is a view for explaining the arrangement of a basic setting management table;

FIG. 40G is a view for explaining the arrangement of an individual setting management table;

FIG. 40H is a view for explaining the arrangement of a print job management table;

FIG. 40I is a view for explaining the arrangement of a scanner job management table;

FIG. 40J is a view for explaining the arrangement of a network setting management table;

DETAILED DESCRIPTION OF THE INVENTION

An embodiment of the present invention will be described below with reference to the accompanying drawing.

Figure 1:
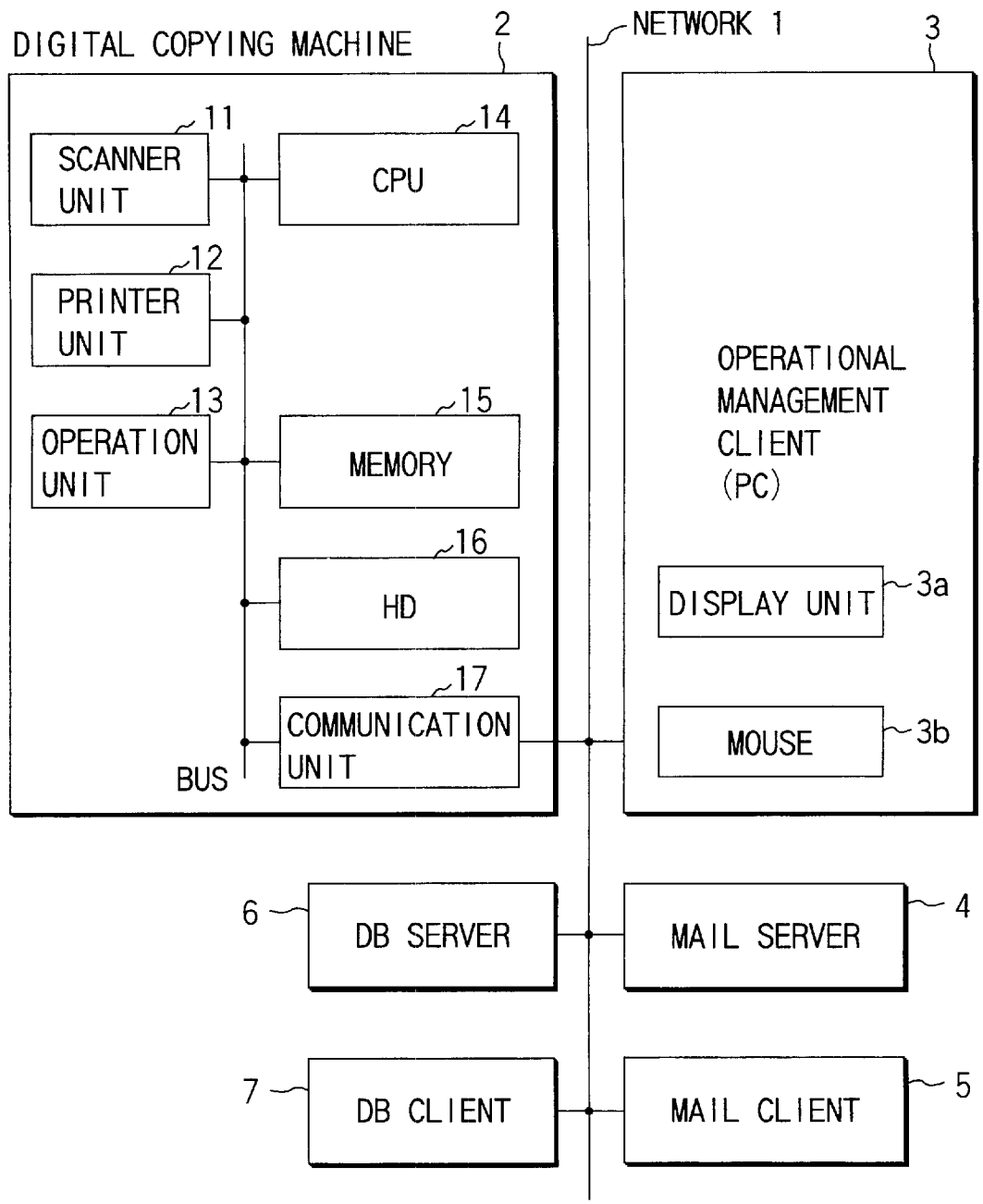
FIG. 1 is a view showing an outline of the arrangement of a whole image processing system according to an embodiment of the present invention.

FIG. 1 shows the arrangement of a whole image processing system.

A digital copying machine 2, an operational management client (remote terminal) 3 constituted by a personal computer (PC) or the like to manage the operation of the digital copying machine 2, a mail server 4, a mail client 5, a DB (database) server 6, and a DB client 7 are connected to a network 1.

Figure 3:
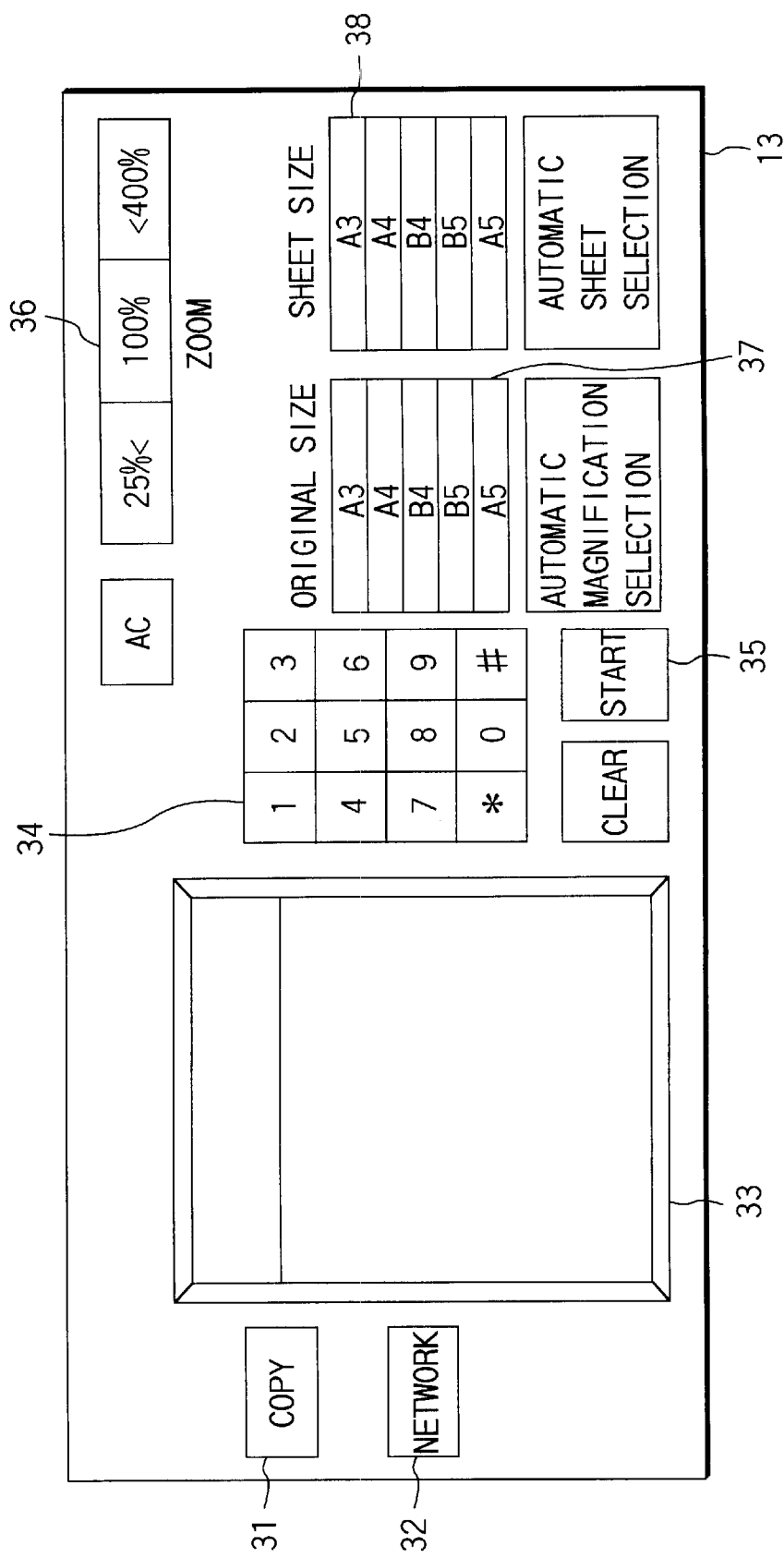
FIG. 3 is a view showing an outline of the arrangement of an operation unit of the digital copying machine.

The digital copying machine 2 includes a scanner unit 11 for scanning a paper original and converting the scanned image into digital image data, a printer unit 12 for printing the image data onto a paper sheet, an operation unit 13 shown in FIG. 3, a CPU 14 for controlling the entire apparatus, a memory 15 and HD (hard disk) 16 for storing control programs and management data, and a communication unit 17 connected to the network 1.

This digital copying machine 2 has a copying function capable of copying from a paper original to a paper sheet. Since this copying function is the same as conventional copying machines, a detailed description thereof will be omitted.

The digital copying machine 2 also has a normal printing function of receiving a print command described in page description language (PDL) from document formation software operating on the client, forming image data from the PDL, and printing the data on a paper sheet. This function is identical with that of a general network printer.

Furthermore, the digital copying machine 2 has a private printing function by which a print command received together with a password from the client is once stored in the digital copying machine 2 and printed after the operator inputs a password from the operation unit 13 of the digital copying machine 2. This private printing function is often used to print highly confidential documents.

The digital copying machine 2 further has a mail function of transmitting image data scanned by the digital copying machine 2 as mail and a DB registration function of registering the image data in the DB server 6. Mail is once transmitted to the mail server 4 and then transmitted from this mail server 4 to an addressed location. When scanned image data is to be transmitted by mail or registered in the DB server 6, this image data is compressed by MH codes or the like to decrease the transfer size, thereby reducing the load on the network 1 and the DB server 6. In mail transmission, binary data cannot be directly transmitted in some instances. Therefore, binary data is transmitted after being converted into ASCII codes or the like.

The operational management client 3 is a personal computer connected to the network 1. This operational management client 3 monitors or changes the operation state of the digital copying machine 2 in a remote place and customizes the printing function, mail transmission function, and DG registration function. Communications between the operational management client 3 and the digital copying machine 2 are sometimes performed using an HTTP (Hyper Text Transfer Protocol) for Web or a dedicated protocol. The operational management client 3 includes a display unit 3a for displaying various data and a mouse 3b as a pointing device.

FIG. 3 shows the operation unit 13 of the digital copying machine 2. A "copy" button 31 on the left-hand side is pressed when the digital copying machine 2 is to singly perform copying (when a copy mode is to be selected). The operator presses an original size setting button 37, a sheet size setting button 38, an enlargement/reduction ratio setting button 36, and a copy quantity setting button 34 on the right-hand side, and starts copying by pressing a "start" button 35.

The operation unit 13 has a liquid crystal display 33 with a touch sensor. This liquid crystal display 33 displays icons (frames and access buttons) representing the present operation state and function. The operator can process various functions by pressing corresponding icons.

The operator presses a "network" button 32 to use the private printing, mail transmission, or DB registration function. The operator performs any of these functions by operating an icon displayed on the liquid crystal display 33.

Figure 4:
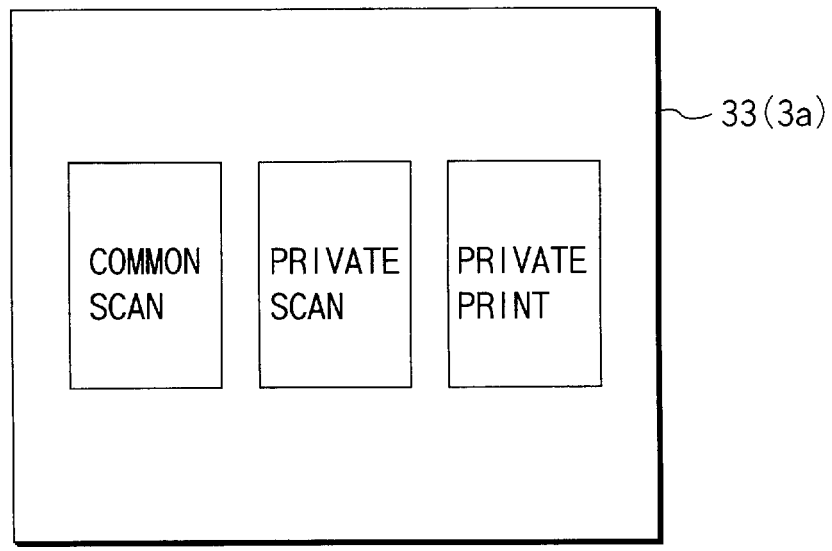

FIGS. 4 to 9 show display examples on the liquid crystal display 33 of the digital copying machine 2. When the "network" button 32 of the operation unit 13 is pressed, a window shown in FIG. 4 is displayed. On this window, icons of "common scan", "private scan", and "private print" are displayed.

"Common scan" and "private scan" are used to transmit scanned image data described above by mail or to register the data in the DB server. "Common scan" can be used by anybody. "Private scan" can be used only by users knowing the password.

Each operation window used by "common scan" and "private scan" is composed of a plurality of frames and a plurality of access buttons arranged in each frame. A frame is a size which can be displayed at one time on the liquid crystal display 33. In this embodiment, six access buttons are arranged in a frame.

Figure 5:
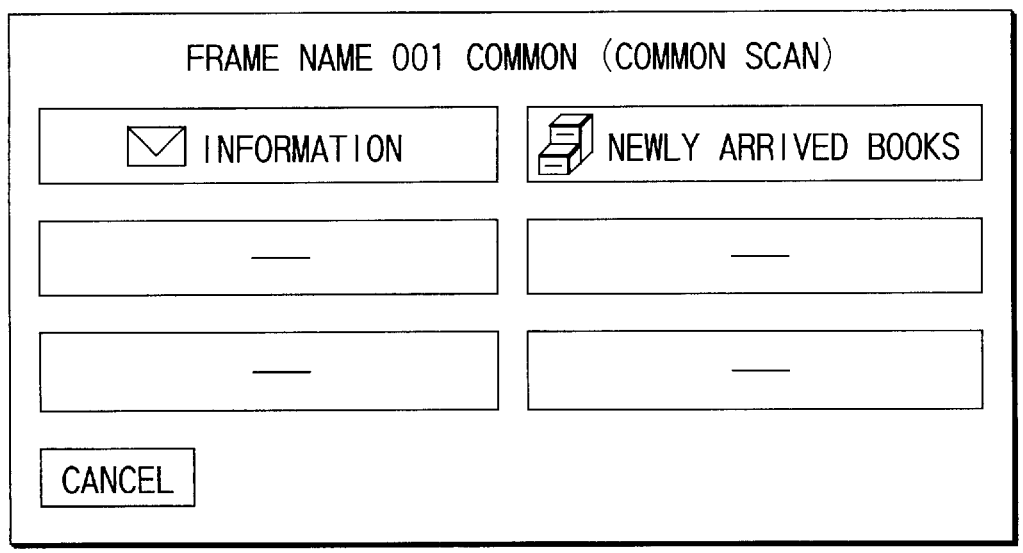

When "common scan" is pressed, a window shown in FIG. 5 is displayed. On this window, six icons are displayed. Each icon contains a figure and a name indicating the function. The upper left icon is for mail transmission, and the upper right icon is for DB registration. When the operator sets a paper original on the scanner unit 11, presses the upper left icon, and presses the "start" button 35 on the operation unit, scanned image data is transmitted by mail to the address set for this icon.

When "private scan" is pressed, a window for inputting a frame number and a password shown in FIG. 6 is displayed. When the operator inputs a desired frame number and a corresponding password on this window and presses "set", icons indicating private functions shown in FIG. 7 are displayed.

The icons for designating mail transmission, DB registration, and the like in the frames displayed when "common scan" and "private scan" are selected will be called "access buttons" hereinafter.

When "private print" is selected, a window for inputting a user name and a password shown in FIG. 8 is displayed. When the operator inputs a desired user name and a password which the operator previously set when selecting private printing, a private printing document list stored in the digital copying machine 2 is displayed as shown in FIG. 9. The operator can print a document on a paper sheet by selecting the document and pressing a "print" button. Also, the operator can simply delete a document from the HD 16 of the digital copying machine 2 by pressing "delete".

Figure 2:
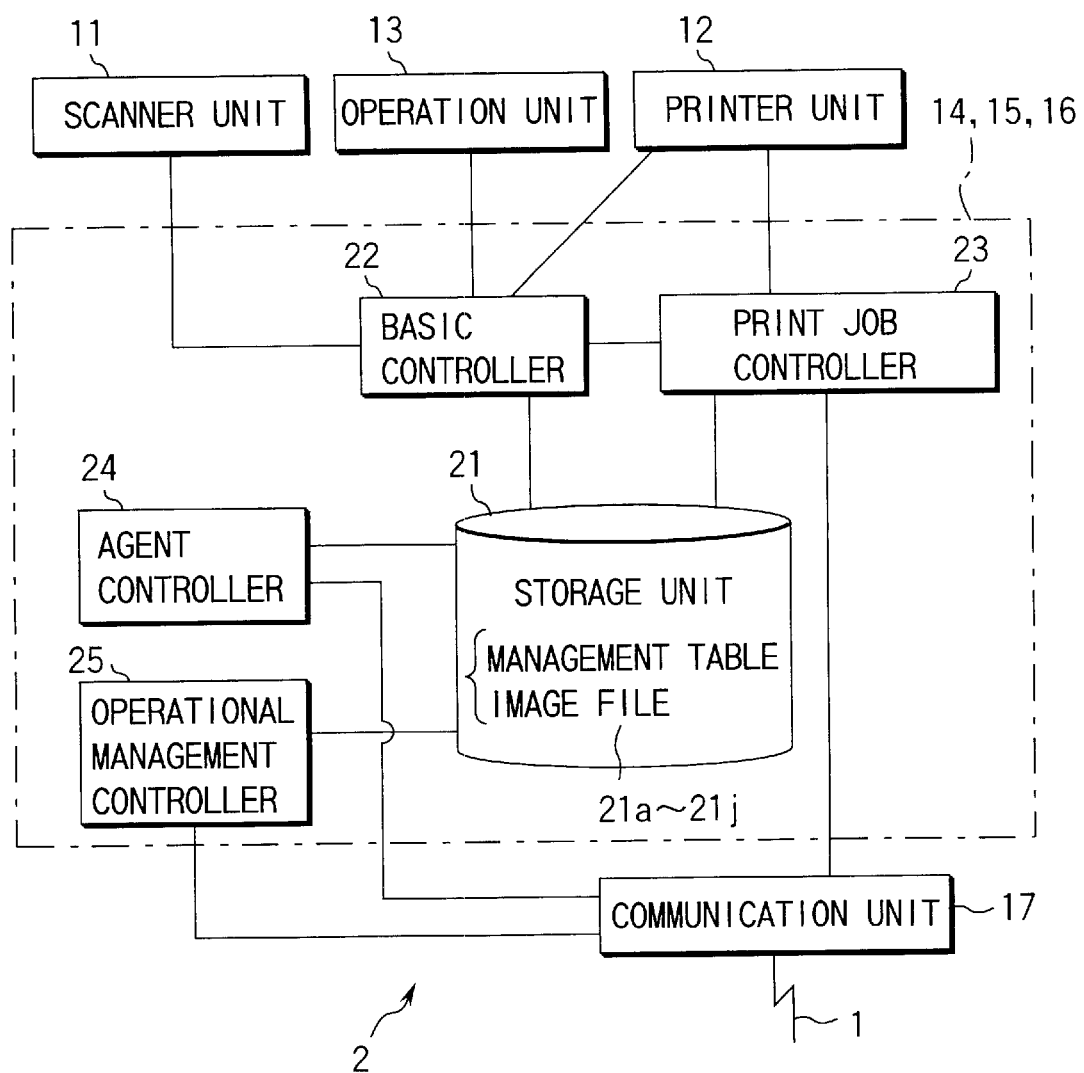
FIG. 2 is a block diagram showing the internal arrangement of a digital copying machine.

FIG. 2 is a block diagram of the digital copying machine 2.

The copying function of this digital copying machine 2 is processed by the scanner unit 11, the printer unit 12, the operation unit 13, a storage unit 21, and a basic controller 22. When receiving instructions from the operation unit 13, the basic controller 22 scans a paper original set on the scanner unit 11 and stores digital image data in the storage unit 21. After that, the basic controller 22 reads out the image data from the storage unit 21 and causes the printer unit 12 to print out the data.

The communication unit 17 is connected to the network 1 to communicate with a client and a server.

A print job controller 23 interprets a print command received from a client, forms image data, and stores the data in the storage unit 21. Also, the print job controller 23 registers this print job in a print job management table 21h (to be described later) in the storage unit 21 by attaching to the job a flag indicating whether the command from the client is normal or private.

When no copying process is performed, the basic controller 22 checks whether a normal print job exists in the storage unit 21. If a normal print job exists, the basic controller 22 reads out the image data of the job and prints out the data.

Also, when "private print" is selected by the operation unit 13, the basic controller 22 reads out a private print job from the storage unit 21 and prints out the data of the job.

Furthermore, when "common scan" or "private scan" is selected by the operation unit 13, the basic controller 22 scans a paper original to form image data and stores the data in the storage unit 21. The basic controller 22 registers the data together with access button information by which this scanner job is selected in a scanner job management table 21i (to be described later) in the storage unit 21.

This basic controller 22 generates a window for selecting functions displayed on the liquid crystal display 33 on the basis of the stored contents of each management table in the storage unit 21. The basic controller 22 also generates, on the basis of the stored contents of each management table, a window based on pressing of the touch panel of the liquid crystal display 33 with respect to the function selecting window.

An agent controller 24 periodically checks the scanner job management table 21i in the storage unit 21. When a new scanner job is registered, the agent controller 24 performs processing, e.g., mail transmission or DB registration, corresponding to a function set for the selected access button.

An operational management controller 25 communicates with the operational management client 3 on the network 1 and shows the arrangement and operation state of the digital copying machine 2 to the operator on the client side, or allows the operator to assign functions such as mail transmission and DB registration to access buttons.

This operational management controller 25 generates a window (for selecting a function of the digital copying machine 2) displayed on the display unit 3a of the operational management client 3 on the basis of the stored contents of each management table in the storage unit 2, and transmits the window to the operational management client 3 via the network 1.

The operational management controller 25 also generates, on the basis of the stored contents of each management table, a window based on instructions (supplied from the operational management client 3 via the network 1) from the mouse 3b with respect to the transmitted window, and transmits the window to the operational management client 3 via the network 1.

Operational management of the digital copying machine 2 will be described below by using windows displayed on the operational management client 3.

FIG. 10 is a window initially displayed when the management utility is activated on the operational management client 3.

When a plurality of digital copying machines 2 are to be managed, it is necessary to select a network address assigned to each of these digital copying machines 2. However, in this embodiment, it is assumed that one digital copying machine 2 is to be managed, and the step of selecting the digital copying machine 2 will be omitted.

The window configuration of the management utility will be explained below. The uppermost level of this window is a status area for displaying the basic operation status of the digital copying machine 2. The second level is a function mode button area for selecting a function mode to be managed. The third level is an area for displaying information in accordance with the selected mode.

The status area displays information indicating whether the digital copying machine 2 is normal or has an error, and information indicating whether the digital copying machine 2 is in an on-line state in which it can receive a print command from a client or in an off-line state in which it cannot.

The function mode button area displays "system configuration", "print job", "scanner job", "printer information", "access button edit", "manager", and "complete" for completing the management utility. The other function modes will be described below.

A default function mode is "system configuration". In this "system configuration" mode, a configuration figure showing the attachment states of paper feed cassettes of the digital copying machine 2 and a finisher for sorting, the apparatus main body, and the versions of control software and the like, and information are displayed.

In the "print job" mode, a window for managing private print jobs is displayed. First, a window for inputting a user name and a password shown in FIG. 11 is displayed. These pieces of information are designated when the user requests private printing from the client and known only to that user. When the correct user name and password are input, a list of private jobs of the designated user shown in FIG. 12 stored in the digital copying machine 2 is displayed. This list shows "document name", "reception date", "sheet size", "number of pages", "status", and a check box for designating deletion. In this embodiment, private print jobs whose user is "Takahashi" are displayed. Each private job can be deleted by clicking on the check box for deletion. When a "delete" button is clicked, a window for confirming deletion shown in FIG. 13 is displayed. When the user clicks on a "delete" button on this window, the private job is deleted.

In the "scanner job" function mode, a window for managing scanner jobs activated by "common scan" or "private scan" is displayed. First, a window for inputting a frame number including access buttons used to activate scanner jobs and a corresponding password shown in FIG. 14 is displayed. Since a frame name "001 common" can be used by anybody, no password is necessary. When the correct frame name and password are input, a list of scanner jobs activated by access buttons in that frame shown in FIG. 15 is displayed. This list shows "frame name", "access button name", "function" assigned to each access button, "reception date", "number of pages", "status" of processing by the agent controller, and a check box for designating deletion. In this example, "003 Ogura" is designated as the frame name, and scanner jobs activated by access buttons in the frame "001 common" that can be used by anybody and in the designated frame "003 Ogura" are displayed. Each scanner job can be deleted by clicking on the corresponding check box for deletion. When a "delete" button is clicked, a window for confirming deletion shown in FIG. 16 is displayed. When the user selects a "delete" button on this window, the scanner job is deleted.

In the "printer information" function mode, pieces of information when the digital copying machine 2 operates as a network printer are displayed as shown in FIGS. 17 and 18. Examples are information indicating whether sorting can be designated and information of usable fonts.

In the "access button edit" function mode, a window for editing the settings of frames and access buttons used in "common scan" and "private scan" of the digital copying machine 2 is displayed.

First, a frame list shown in FIG. 19 is displayed. When the "001 common" frame that can be used by anybody is chosen, a window for selecting whether only reference or editing is to be performed is displayed as shown in FIG. 20. When editing is selected, a password must also be input.

When only reference is selected, as shown in FIG. 21, a list of access buttons in the "001 common" frame is displayed in the same form as displayed on the liquid crystal display 33 of the digital copying machine 2. In addition, on the side of the frame name, a counter is displayed which indicates the number of times of processing performed in the past by the access buttons in this frame. This permits the operator to check the use frequency. In the example shown in FIG. 21, access button 1 has a name "information" and an icon indicating mail transmission, and access button 2 has a name "newly arrived books" and an icon indicating DB registration.

When any of these access button areas in this frame is selected, a window indicating the set contents of the selected access button is displayed. FIG. 22 shows a window displaying the set contents of the first access button "information". This window displays an assigned function, name, and icon, and the set contents when the scanner unit 11 scans a paper original in accordance with this access button.

When "detailed display" on the side of the function is selected, a window displaying the detailed settings of the mail transmission function to be processed when this access button is chosen is displayed as shown in FIG. 23. In this example, a transmission source "From" is "ken@toshiba.co.jp", a destination "To" is "miy@toshiba.co.jp", and "Subject" is "information from general affairs department". It is also shown that in attaching scanned image data, transmission mail is divided when encoded by a MIME (Multipurpose Internet Mail Extensions) format, and the division size is 128 KB.

When editing is selected, as shown in FIG. 24, a list of access buttons in the "001 common" frame is displayed in the same form as displayed on the liquid crystal display 33 of the digital copying machine 2. The difference from the list when only reference is selected is that a "frame name set" button is shown on the side of the frame name and the settings of each access button can be edited on a window displaying the set contents of these access buttons. When the operator selects the "frame name set" button, a window shown in FIG. 25 is displayed, and he or she can set a frame name and password for editing the frame.

Figure 26:

When an access button is selected, a window shown in FIG. 26 is displayed. This window displays a function assigned to the selected access button, the name and icon shape of the button, and scanner settings. The window also displays buttons for changing the settings of these three items and a password set button for executing this access button.

When the operator selects "change function", a window shown in FIG. 27 or 28 is displayed, so he or she can check, and also change, the present detailed settings assigned to the access button. FIG. 27 shows the present settings that the function is "DB" and the DB server name is "general affairs department server". The settings after the DB server name can be changed by changing the item and clicking on a set button. To change the function, the operator selects the toggle switch of the assigned function "Assigned function" to display the window shown in FIG. 28. On this window, the operator can input and set the settings of From, To, and Subject of mail transmission.

When "change display" is selected, a window shown in FIG. 29 is displayed. This window displays a current button name and icon shape when they are displayed on the liquid crystal display 33 of the digital copying machine. The operator can change these items on this window. An icon shape can be chosen from currently registered icon shapes or newly formed.

When "change scan" is selected, a window shown in FIG. 30 is displayed. This window displays the present scanner settings set when this access button is designated. The operator can change these settings.

When "change password" is selected, as shown in FIG. 31, a window for changing the settings of a password to be designated in executing this access button is displayed. If the password is kept blank without being set, when the access button is executed no window for inputting a password is displayed.

When a frame except for the "001 common" frame that can be used by anybody is chosen in the "access button edit" function mode, a window for inputting a password for accessing the selected frame is displayed as shown in FIG. 32. FIG. 32 shows an example in which the frame number is "003". After the operator inputs a password and clicks on a set button, he or she can perform the access button editing explained in FIGS. 24 to 31.

The "manager" function mode can be used only by an operator who knows the password of the manager. This operator can perform all print jobs and scanner jobs and can change all of agent basic settings, network settings, and password settings.

In this "manager" function mode, a window for inputting the password of the manager shown in FIG. 33 is initially displayed. When a correct password is input and set, a window shown in FIG. 34 is displayed. On the left-hand side of this window, manager function mode select buttons which function in the "manager" function mode are displayed.

A default manager function mode is "print job", and a list of all print jobs is displayed as shown in FIG. 34. In "print job" to be used by a general operator shown in FIG. 12, only private print jobs of a designated user are displayed. In "print job" displayed in the manager function mode, however, all private print jobs and normal print jobs of all users are displayed, so the operator can check the status (waiting for printing, printing, printing complete, error) of each print job. The operator can delete a print job which he or she wants to delete from the list by checking the print job and clicking on a delete button.

In "scanner job" in the manager function mode, a list of scanner jobs of all users is displayed, so the operator can check the processing status (waiting for processing, processing, processing complete, error) of each scanner job by the agent. The operator can delete a scanner job which he or she wants to delete from the list by checking the scanner job and clicking on a delete button.

In "agent basic settings" in the manager function mode, a window shown in FIGS. 36 or 37 is displayed. The operator can check and change the basic settings in mail transmission or DB registration agent processing.

FIG. 36 is an agent basic setting window for mail transmission. On this window, the operator can set an SMTP (Simple Mail Transfer Protocol) server name as the DB server 6 and a maximum transmission size during mail transmission. If the total size of attached image data exceeds this maximum transmission size, mail transmission ends up with an error, and the status is recorded as an error in the scanner job list.

FIG. 37 is an agent basic setting window for DB registration. On this window, the operator can set the maximum size of image data sizes to be registered in the DB server 6.

In "network setting" in the manager function mode, as shown in FIG. 38, network settings can be performed.

Figure 39:
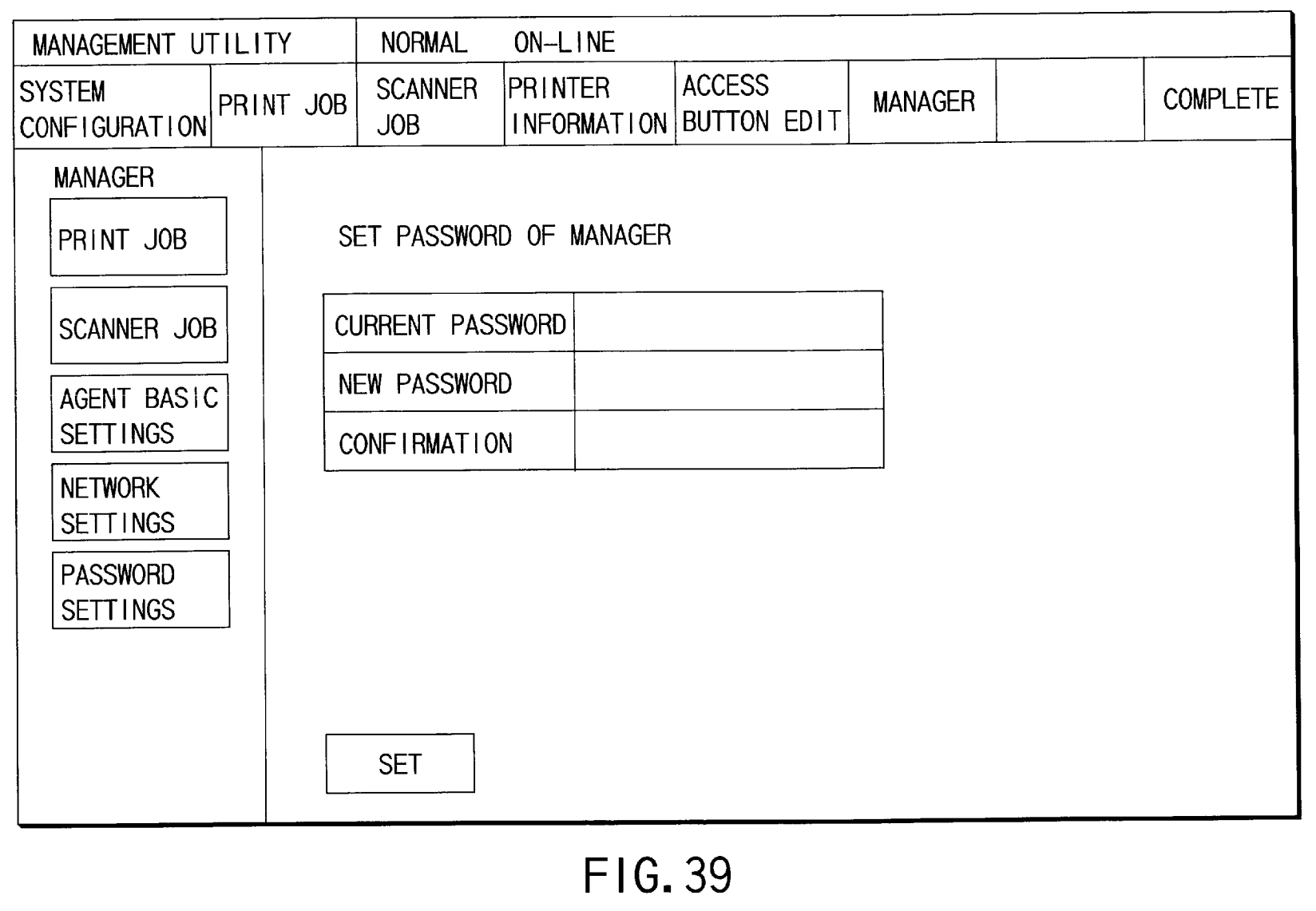

In "password setting" in the manager function mode, as shown in FIG. 39, the password of the manager can be set.

The arrangements of management tables in the storage unit 21 in the block diagram shown in FIG. 2 will be described below with reference to FIGS. 40A to 40J.

FIG. 40A shows a manager password management table 21a for managing the password of the manager.

FIG. 40B shows a frame management table 21b for managing frames displayed on the liquid crystal display 33 of the digital copying machine 2 in "common scan" and "private scan". This frame management table 21b stores frame names, passwords, and the like.

A frame number "001" can be used by anybody, so no password is set for this frame number. For each frame, a counter is stored which indicates the number of times of processing performed using access buttons in this frame. A button management table pointer is for a button management table 21c for managing information of access buttons in each frame.

FIG. 40C shows this button management table 21c which stores button numbers, icon numbers, scanner settings, agent numbers, parameters, and counters of access buttons. The icon numbers correspond to numbers in an icon management table 21d shown in FIG. 40D. This icon management table 21d stores the shapes of these icons. The scanner settings indicate the settings of the scanner unit 11 set when a corresponding access button is operated. The agent numbers correspond to numbers in an agent management table 21e shown in FIG. 40E. This agent management table 21e stores the settings of each agent which operates when a corresponding access button is operated. The parameters are individual parameters of each access button when a corresponding agent operates. In the case of mail transmission, for example, "From:ken@toshiba.co.jp, To:miy@toshiba.co.jp, . . ." are stored.

The agent management table 21e shown in FIG. 40E stores the name, basic setting management table pointer, and individual setting parameter management table pointer of each agent. In the example shown in FIG. 40E, settings of mail transmission and DB registration are stored.

FIG. 40F shows a basic setting management table 21f which stores the common settings of agents. In the case of a main transmission agent, an SMTP server name, a transmission size limit, and size information are stored.

FIG. 40G shows an individual setting parameter management table 21g which stores items for displaying a window for setting individual parameters of each access button as shown in FIG. 28, and stores settings pertaining to values to be stored in the parameters of the button management table. When the agent is mail transmission, five individual parameters are stored such that: "From", "To", and "Subject" are processed as character strings, "MIME division" is processed as selection of divide/do not divide, and "division size" is processed as a numerical value.

FIG. 40H shows a print job management table 21h which stores information of all normal print jobs and private print jobs.

FIG. 40I shows a scanner job management table 21i which stores information of all scanner jobs.

FIG. 40J shows a network setting management table 21j which stores the computer name, the IP address, and the like of the digital copying machine 2.

The operational management controller 25 of the digital copying machine 2 and the flow of an operational management process for the digital copying machine 2, which operates on the operational management client 3, will be described below with reference to flow charts.

Figure 41:
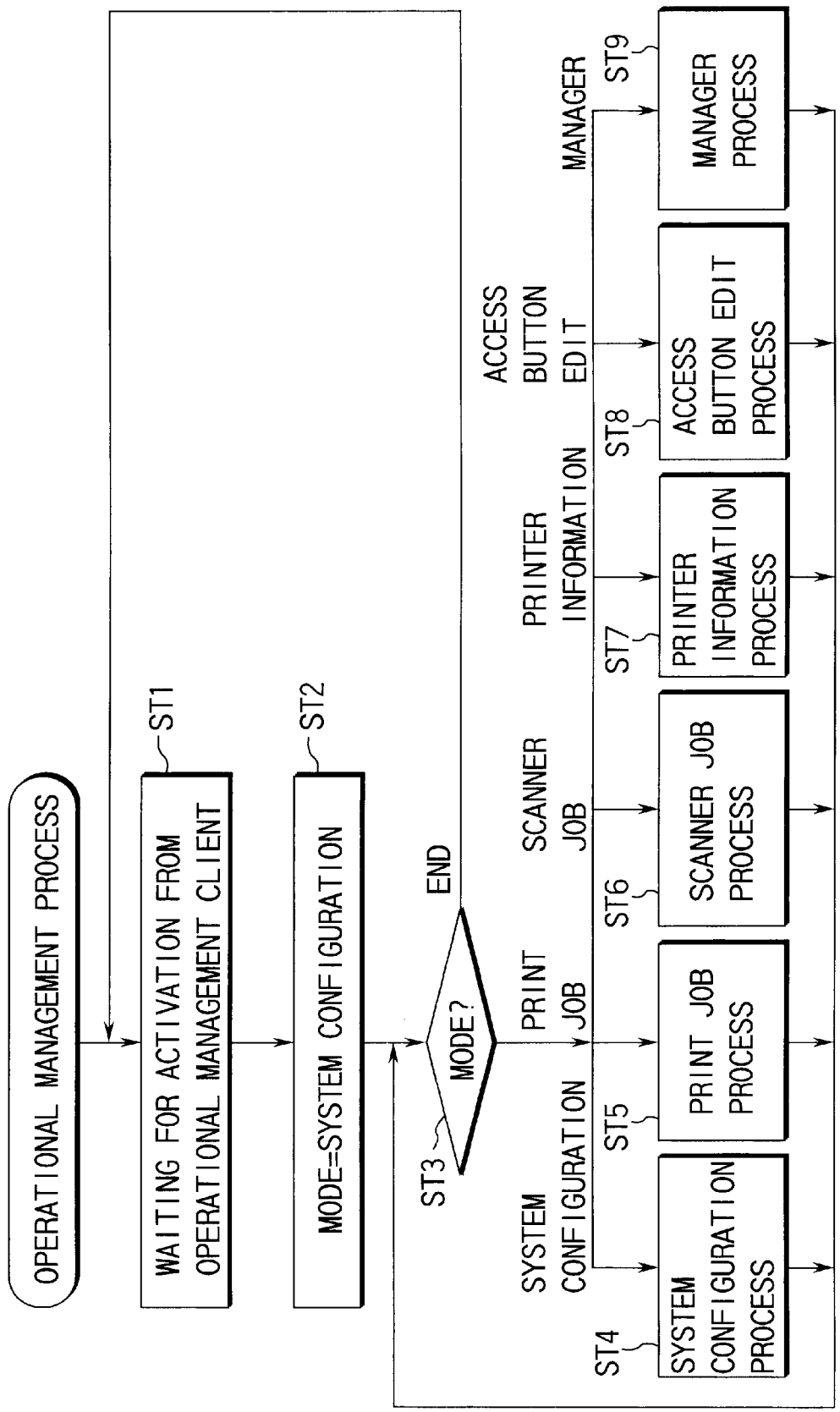
FIG. 41 is a flow chart for explaining an operational management process.

FIG. 41 is a main flow chart of the operational management process.

First, the operational management controller 25 waits for an activation request from the operational management client 3 on the network 1 (ST1). When receiving this activation request, the operational management controller 25 sets the default system configuration in a mode variable indicating the function mode (ST2) and proceeds on to a process corresponding to the mode variable. After returning from the process corresponding to the mode variable, the operational management controller 25 rechecks the mode variable (ST3). If "end" is set in the mode variable, the flow returns to step ST1 to wait for an activation request from the operational management client 3 on the network 1. If another function mode is set, the flow advances to a process (ST4 to ST9) corresponding to the mode variable.

This process corresponding to the mode variable is one of "system configuration", "print job", "scanner job", "printer information", "access button edit", and "manager" in the function mode button area shown in FIG. 10.

In each process, the digital copying machine 2 communicates with the operational management client 3 on the network 1 to perform the process of operating the windows shown in FIG. 10 to FIG. 39. A Web browser operates on the operational management client 3, and a Web server operates on the digital copying machine 2. The operational management controller 25 generates a window on the basis of the stored contents of each table in the storage unit 2 and the instruction from the operational management client 3, and transmits the window to the operational management client 3. However, this can also be accomplished by using a dedicated program. That is, the processing in the operational management controller 25 can be realized by a dedicated program as an application of the operational management client 3.

Processes for "system configurations" and "printer information" are the same as the management utility of conventional network printers, so a detailed description thereof will be omitted.

Figure 42:
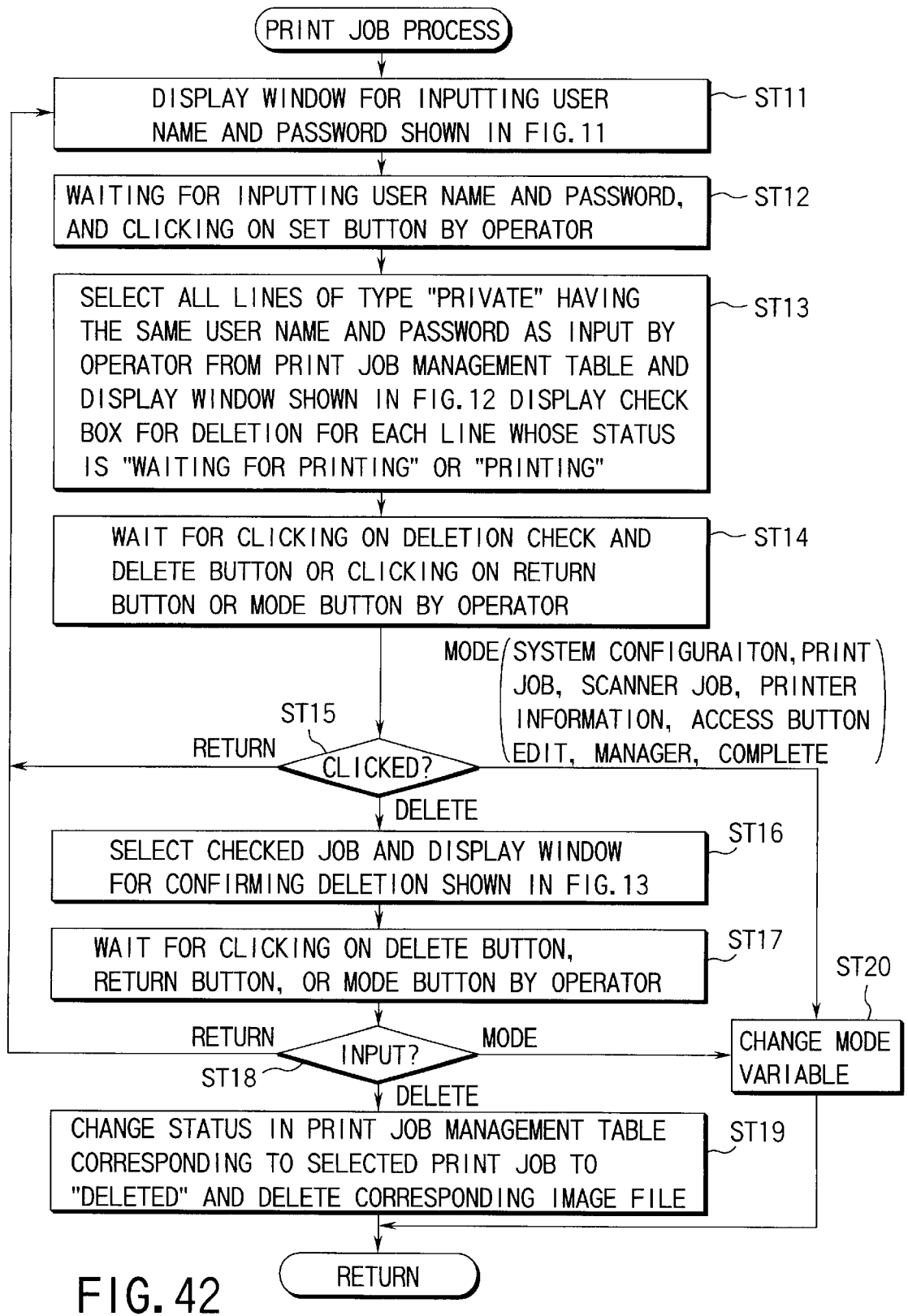
FIG. 42 is a flow chart for explaining a print job process.

FIG. 42 shows a flow chart of the print job process.

First, the operational management controller 25 displays, as shown in FIG. 11, a window for inputting a user name and a password designated when the client requests private printing (ST11). The operational management controller 25 waits for input from the operator. If the set button is clicked, the operational management controller 25 selects print jobs which are "private" and have the same user name and password as input by the operator, and displays a list of the selected print jobs (ST13). A check box □ for designating deletion is displayed for a print job whose status is "waiting for printing" or "printing" (ST13). The operational management controller 25 also displays a delete button, a return button, and various mode buttons ("system configuration", "print job", "scanner job", "printer information", "access button edit", "manager", and "complete") (ST13).

The operational management controller 25 waits for clicking from the operator (ST14). If the delete button is clicked (ST15), the operational management controller 25 displays, as shown in FIG. 13, a window for checking whether the checked print job is to be deleted (ST16), and waits for clicking from the operator (ST17). If a delete button is clicked in this window (ST18), the operational management controller 25 changes the status of the checked print job in the print job management table 21h to "deleted" and deletes image data corresponding to this print job (ST19).

If the operator clicks on a mode button in the function mode button area in step ST15 or ST18, the operational management controller 25 changes the mode variable (ST20), and the flow returns.

If the operator clicks on the return button in step ST15 or ST18, the flow returns to step ST11.

Figure 43:
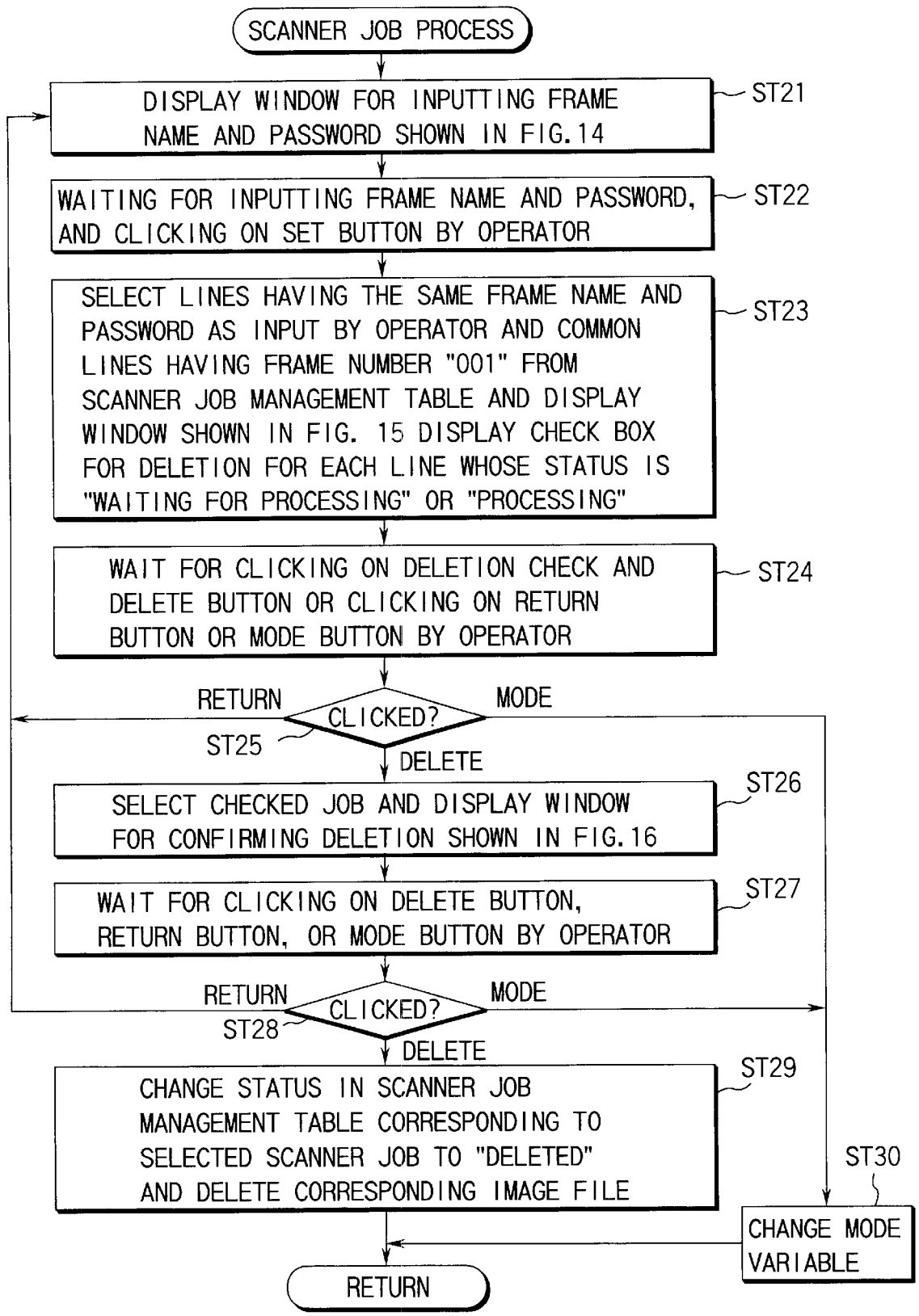
FIG. 43 is a flow chart for explaining a scanner job process.

FIG. 43 shows a flow chart of the scanner job process.

First, the operational management controller 25 displays a window for inputting a frame name including an access button used by the operator and a password as shown in FIG. 14 (ST21). The operational management controller 25 waits for input from the operator (ST22). If a set button is clicked, the operational management controller 25 selects from the scanner job management table 21i a scanner job having the same frame name and password as input by the operator and scanner jobs as common frames having the frame number "001", and displays a list of the selected scanner jobs as shown in FIG. 15 (ST23). A check box □ for designating deletion is displayed for a scanner job whose status is "waiting for processing" or "processing" (ST23). The operational management controller 25 also displays a delete button, a return button, and various mode buttons ("system configuration", "print job", "scanner job", "printer information", "access button edit", "manager", and "complete") (ST23).

The operational management controller 25 waits for clicking from the operator (ST24). If the delete button is clicked (ST25), the operational management controller 25 displays, as shown in FIG. 16, a window for checking whether the checked scanner job is to be deleted (ST26), and waits for clicking from the operator (ST27). If a delete button is clicked in this window (ST28), the operational management controller 25 changes the status of the checked scanner job in the scanner job management table 21i to "deleted" and deletes image data corresponding to this scanner job (ST29).

If the operator clicks on a mode button in the function mode button area in step ST25 or ST28, the operational management controller 25 changes the mode variable (ST30), and the flow returns.

If the operator clicks on the return button in step ST25 or ST28, the flow returns to step ST21.

Figure 44:
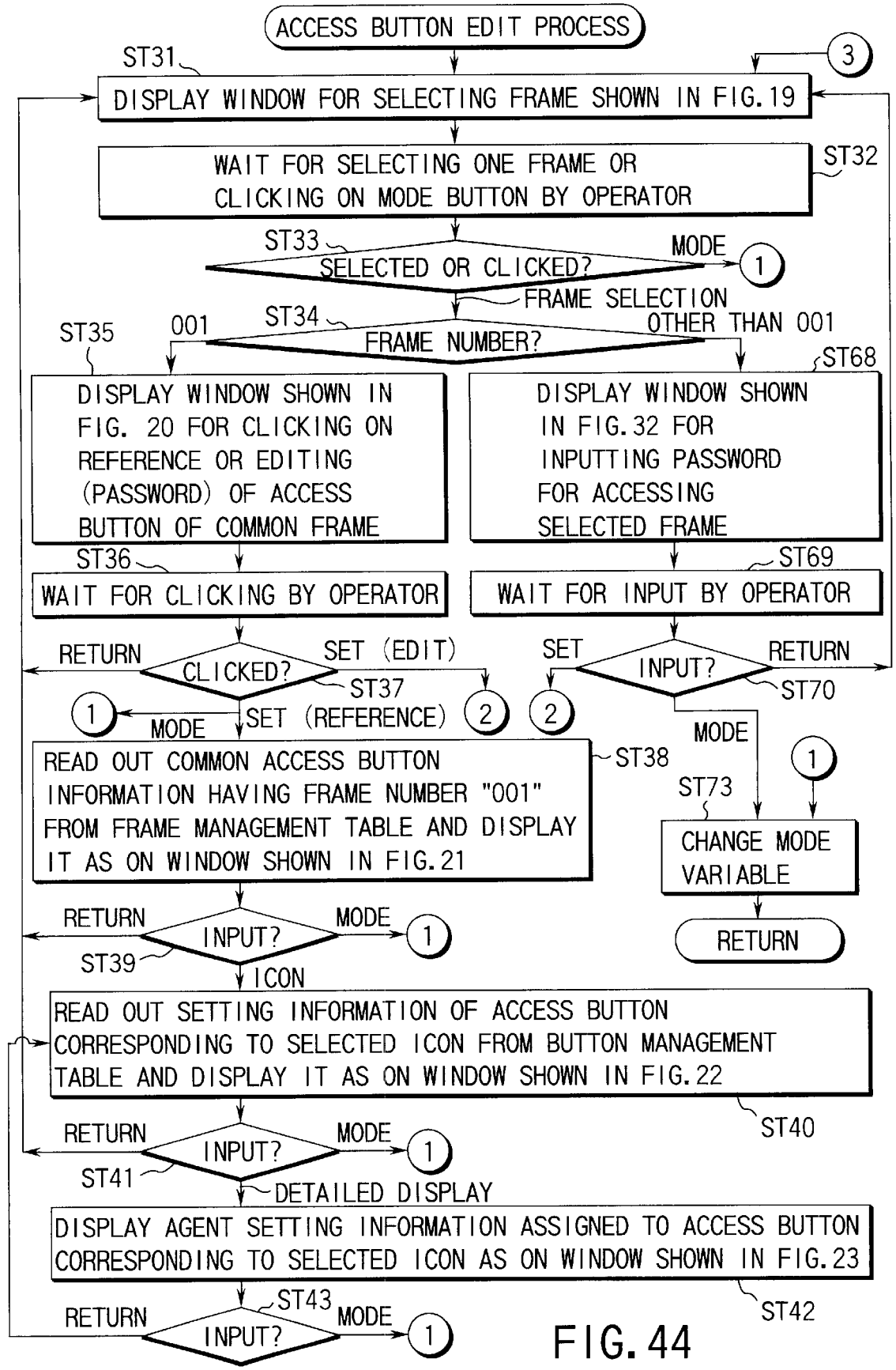
FIGS. 44 to 46 are flow charts for explaining an access button edit process.
Figure 45:
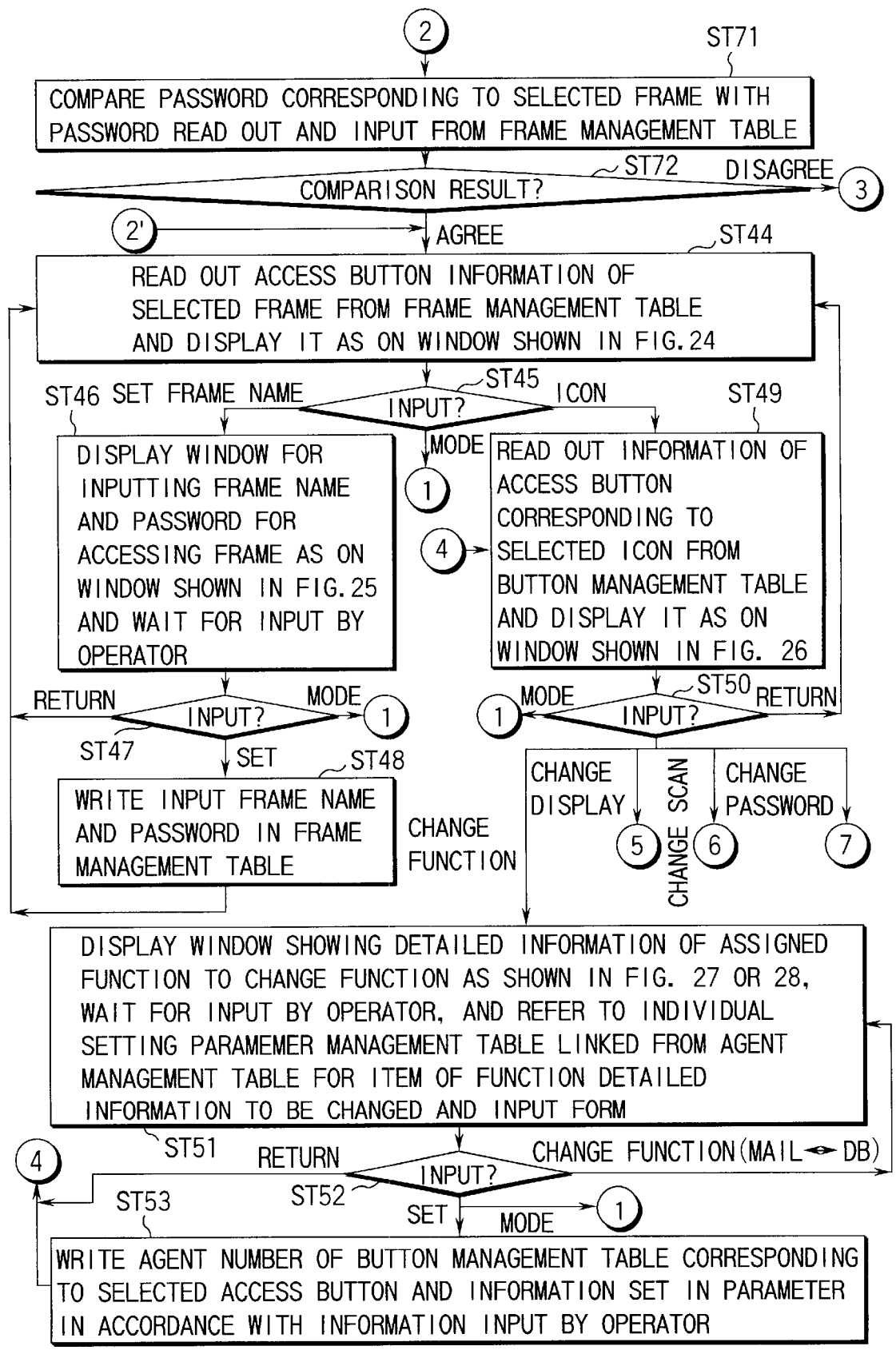
Figure 46:
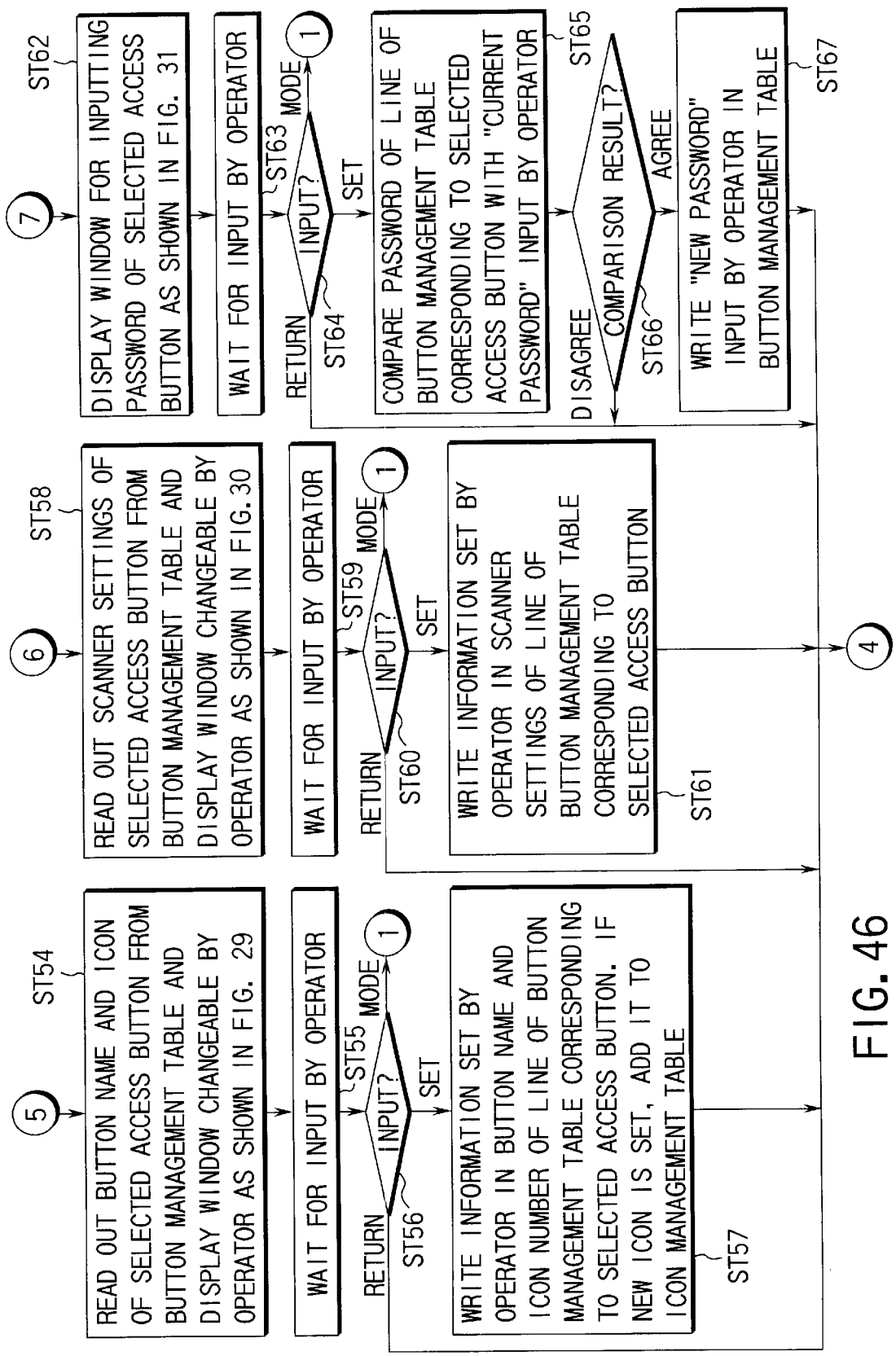
Figure 47:
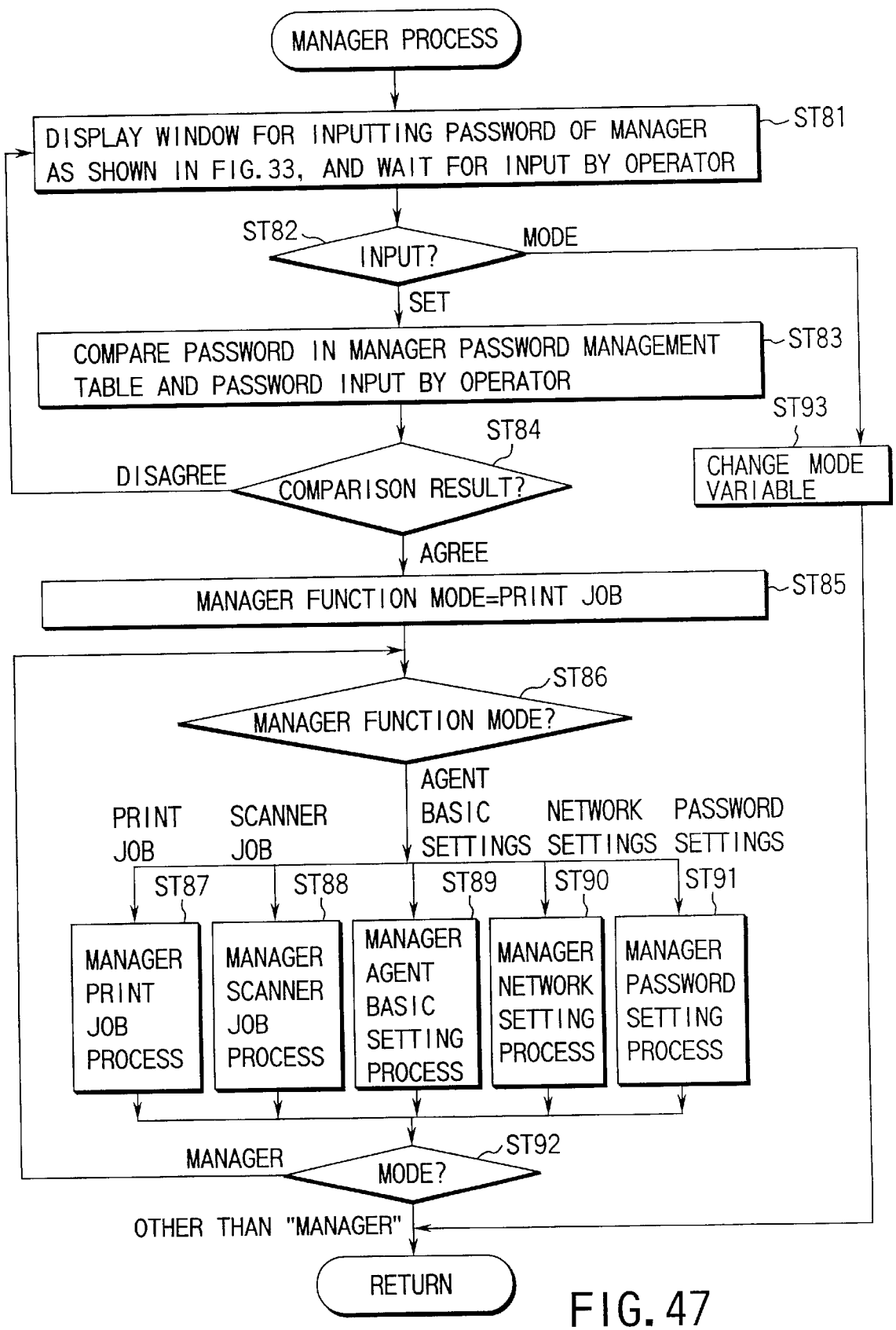
FIG. 47 is a flow chart for explaining a manager process.
Figure 48:
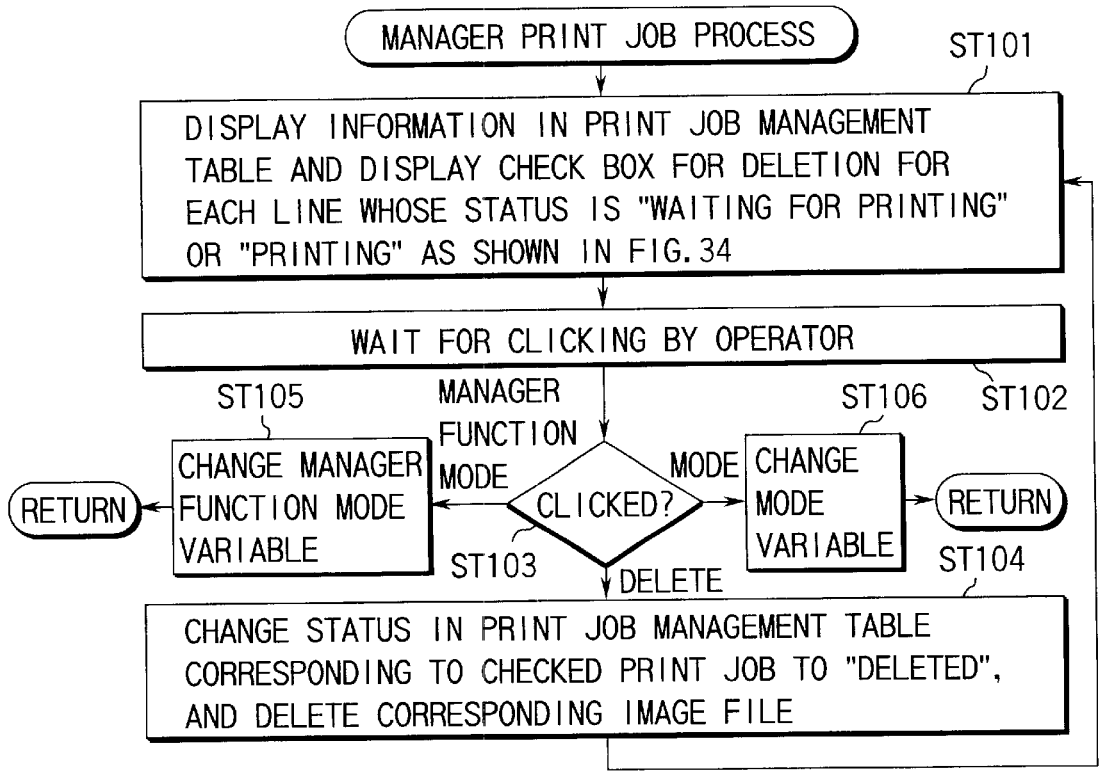
FIG. 48 is a flow chart for explaining a manager print job process.
Figure 49:
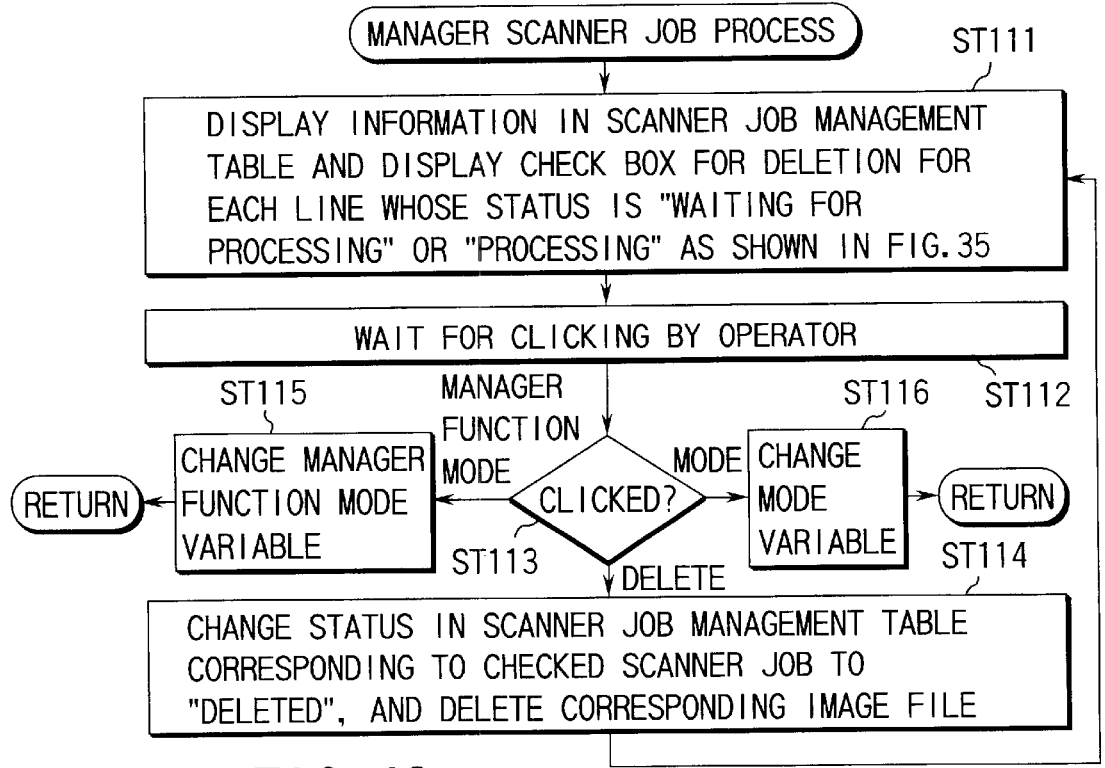
FIG. 49 is a flow chart for explaining a manager scanner job setting process.
Figure 50:
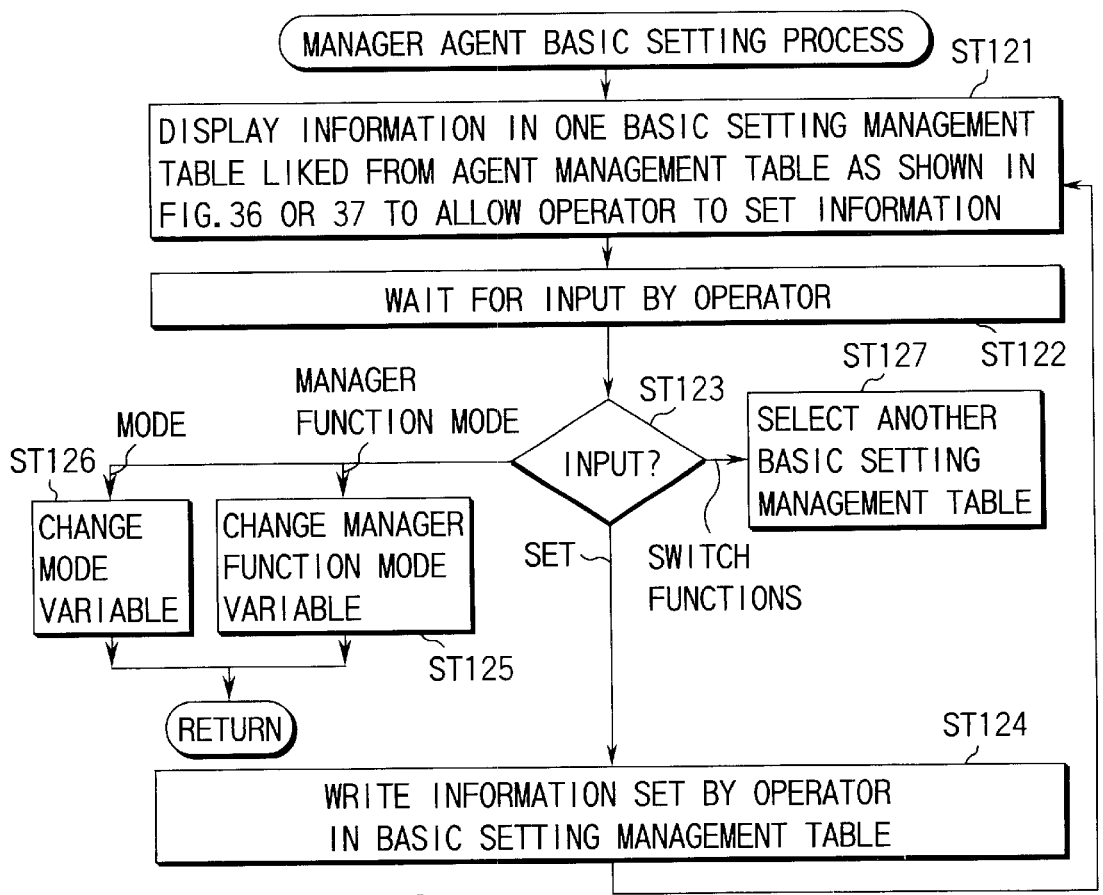
FIG. 50 is a flow chart for explaining a manager agent basic setting process.
Figure 51:
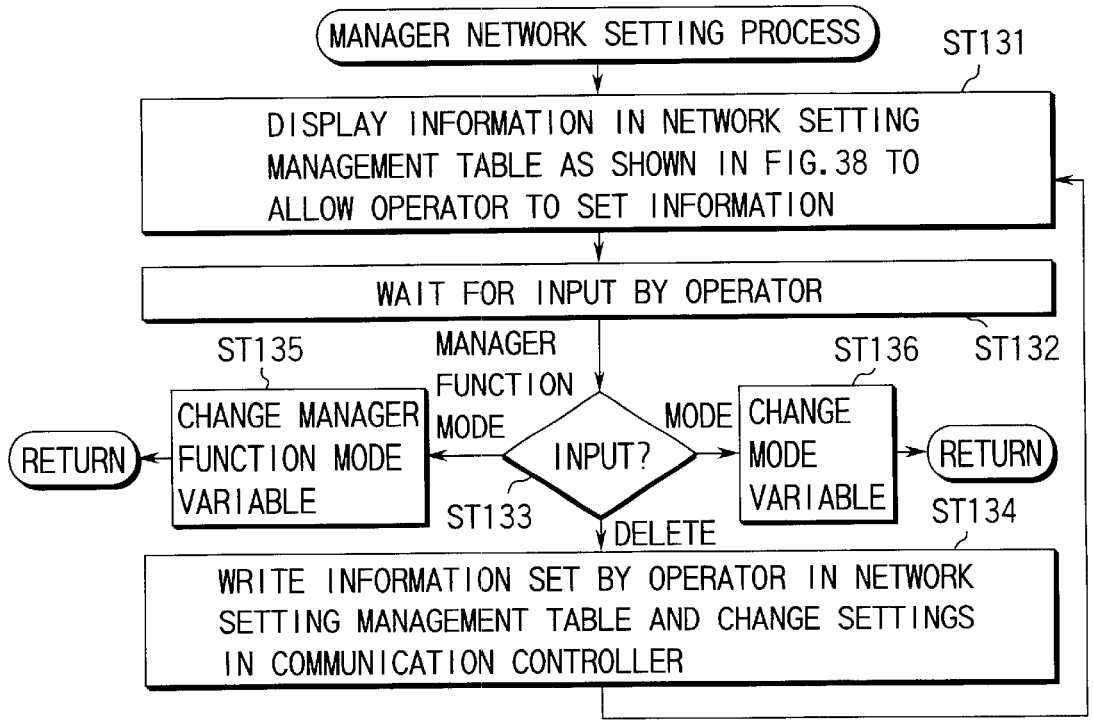
FIG. 51 is a flow chart for explaining a manager network setting process.
Figure 52:
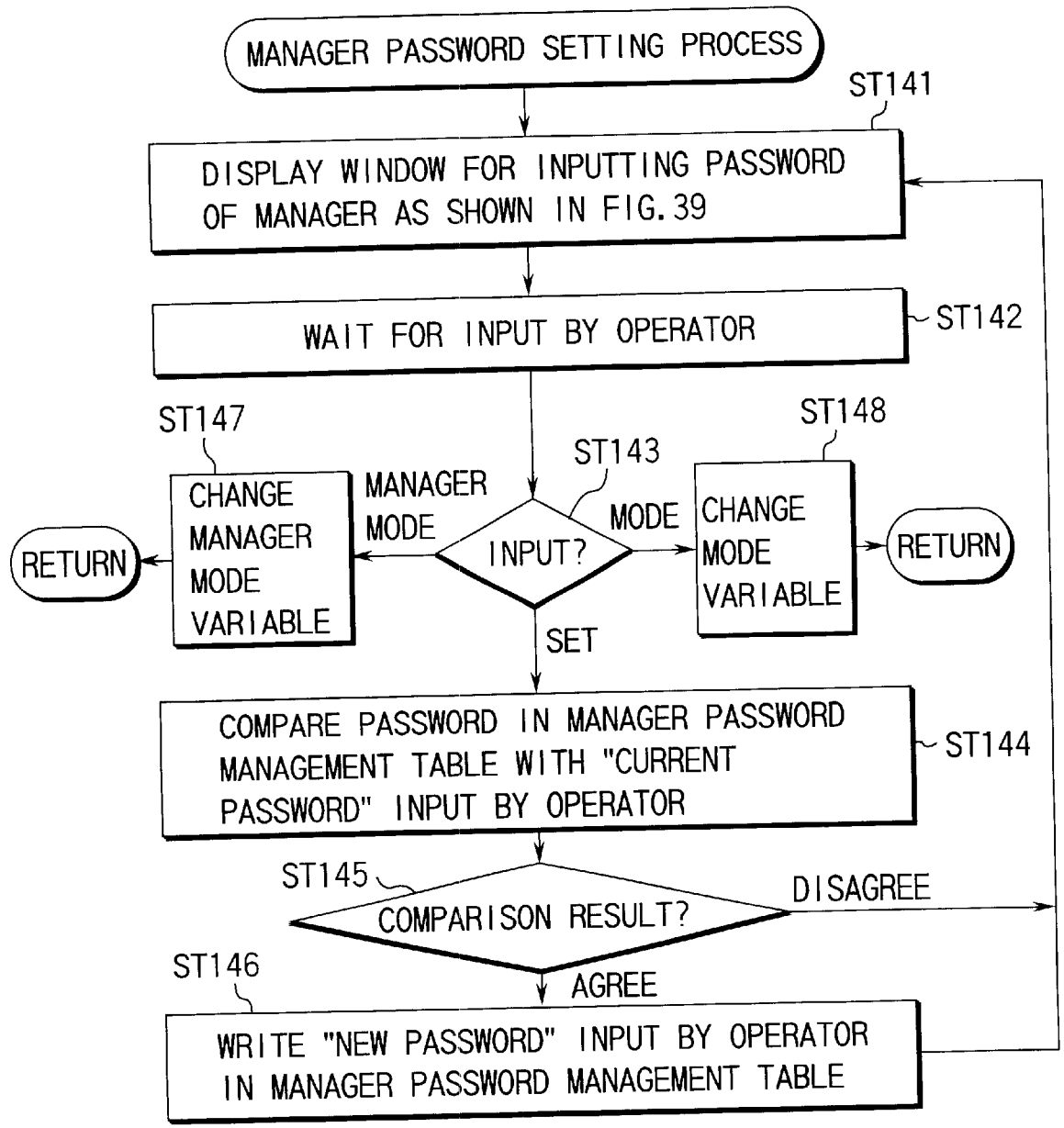
FIG. 52 is a flow chart for explaining a manager password setting process.

FIGS. 44 to 46 show flow charts of the access button edit process.

First, the operational management controller 25 displays all pieces of frame information in the frame management table 21b for frame selection as shown in FIG. 19 (ST31) and waits for clicking from the operator (ST32).

If a common frame having the frame number "001" is selected (ST33 or ST34), the operational management controller 25 displays, as shown in FIG. 20, a window for selecting whether pieces of setting information of access buttons in the common frame are to be only referred to or edited (this requires a password)(ST35), and waits for clicking from the operator (ST36).

If only reference is selected (ST37), the operational management controller 25 reads out pieces of setting information of access buttons in the common frame from the frame management table 21b and the button management table 21c, displays the readout information, as shown in FIG. 21, in the same form as displayed on the liquid crystal display 33 of the digital copying machine 2 such that each access button is selectable, and waits for input from the operator (ST38).

If the operator selects one of these access buttons (ST39), the operational management controller 25 reads out the detailed settings of this access button from the button management table 21c, displays the readout data as shown in FIG. 22, and waits for input from the operator (ST40). If a detailed display button in FIG. 22 is clicked (ST41), the operational management controller 25 displays individual function setting information assigned to the access button as shown in FIG. 23 and waits for input from the operator (ST42).

If editing is selected in step ST37, the operational management controller 25 reads out the setting information of access buttons in the common frame from the frame management table 21b and the button management table 21c, displays the readout information in an editable form as shown in FIG. 24, and waits for input from the operator (ST44).

If a frame name set button is clicked (ST45), the operational management controller 25 displays a window shown in FIG. 25 for setting and changing a frame name and a password for accessing the frame, and waits for input from the operator (ST46).

If the operator clicks a set button (ST47), the operational management controller 25 writes the input new frame name and password in the frame management table 21b (ST48).

If the operator selects an access button (ST45) with the access button list as shown in FIG. 25 displayed to be editable in step ST44, the operational management controller 25 reads out the detailed settings of the access button from the button management table 21c, displays the readout settings to be editable as shown in FIG. 26, and waits for input from the operator (ST49).

If a change function button is clicked (ST50), the operational management controller 25 displays individual function setting information assigned to the access button so as to be editable as shown in FIG. 27 or 28, and waits for input from the operator (ST51). Also, for an item of the function detailed information to be changed and an input form, the operational management controller 25 looks up the individual setting parameter management table 21g linked from the agent management table 21e.

If a set button is clicked (ST52), the operational management controller 25 writes the information changed and set by the operator into the button management table 21c (ST53).

If a change display button is clicked in step ST50, the operational management controller 25 displays the button name and icon shape of the access button so as to be editable as shown in FIG. 29 (ST54), and waits for input from the operator (ST55). If the operator clicks on a set button (ST56), the operational management controller 25 writes the newly set button name and icon shape into the button management table 21c (ST57). If a new icon is formed, the icon image is downloaded from the operational management client 3 into the digital copying machine 2 and stored in the icon management table 21d (ST57).

If a change scanner button is clicked in step ST50, the operational management controller 25 displays scanner settings, which are set when an access button is operated, in an editable form as shown in FIG. 30 (ST58), and waits for input from the operator (ST59). If the operator clicks on a set button (ST60), the operational management controller 25 writes the newly set scanner settings in the button management table 21c (ST61).

If a change password button is clicked in step ST50, the operational management controller 25 displays a window for inputting a current password and a new password as shown in FIG. 31 (ST62), and waits for input from the operator (ST63). If the operator clicks on a set button (ST64), the operational management controller 25 compares the current password with the internal value of the button management table 21c (ST65). If the two values agree (ST66), the operational management controller 25 writes the new password in the button management table 21c (ST67).

In the above explanation, the processes for the common frame having the frame number "001" have been described. If another frame is selected in step ST34, as shown in FIG. 32, the operational management controller 25 displays a window for inputting the password of the selected frame (ST68) and waits for input from the operator (ST69).

If the operator clicks on a set button (ST70), the operational management controller 25 reads out a password stored in the button management table 21c and corresponding to the frame selected by the operator, and compares the readout password with the input password (ST71). If the two passwords agree (ST72), the flow advances to step S44 to perform the frame and access button edit processes described above.

If the operator clicks on a mode button in the function mode button area in step ST33, ST37, ST39, ST41, ST43, ST45, ST47, ST50, ST52, ST56, ST60, ST64, or ST70, the operational management controller 25 changes the mode variable (ST73) and returns.

If the operator clicks on a return button in step ST37, ST39, ST41, ST45, or ST70 or if disagreement is found in step S72, the flow returns to step ST31.

If the operator clicks on a return button in step ST43, the flow returns to step ST40.

If the operator clicks on a return button in step ST50, the flow returns to step ST44.

If the operator clicks on a return button in step ST52, ST56, ST60, or ST64, the flow returns to step ST49, provided that disagreement is found in step ST66 when the process in step ST53, ST57, ST61, or ST67 is complete.

FIGS. 47 to 52 show flow charts of the manager process.

The operational management controller 25 displays a window for inputting the password of the manager as shown in FIG. 33 and waits for clicking from the operator (ST81). If a set button is clicked (ST82), the operational management controller 25 compares the password input by the operator with the password of the manager stored in the manager password management table 21a (ST83). If the two passwords agree (ST84), the operational management controller 25 substitutes "print job" into a manager function mode variable shown in FIG. 34 (ST85) and proceeds on to a process corresponding to the manager function mode (ST86 to ST91).

This manager function mode is one of "print job", "scanner job", "agent basic settings", "network settings", and "password settings". A default manager function mode is "print job".

If the flow is returned from the process corresponding to the manager function mode, the operational management controller 25 refers to the mode variable corresponding to the function mode button area shown in FIG. 10. If the value is other than "manager" (ST92), the flow returns from the manager process. If the value is "manager", the flow again moves to the process corresponding to the manager function mode variable.

If the operator clicks on a mode button in the function mode button area in step ST82, the operational management controller 25 changes the mode variable (ST93) and returns. If disagreement is found in step S84, the flow returns to step ST81.

In the manager print job process, the operational management controller 25 displays information of all print jobs in the print job management table 21h as shown in FIG. 34 such that a check box ☐ for deletion is displayed for each print job whose status is "waiting for printing" or "printing" (ST101), and waits for clicking from the operator (ST102). If the delete button is CLICKED (ST103), the operational management controller 25 changes the status of the print job checked by the operator in the print job management table 21h to "deleted", and deletes the corresponding image data (ST104).

If the operator clicks on a button corresponding to the manager function mode (ST103), the operational management controller 25 changes the manager function mode variable (ST105) and returns from the print job process. If a button corresponding to the function mode button area in FIG. 34 is clicked (ST103), the operational management controller 25 changes the mode variable (ST106) and returns.

In the manager scanner job process, the operational management controller 25 displays information of all scanner jobs in the scanner job management table 21i as shown in FIG. 35 such that a check box ☐ for deletion is displayed for each scanner job whose status is "waiting for processing" or "processing" (ST111), and waits for CLICKING from the operator (ST112). If a delete button is clicked (ST113), the operational management controller 25 changes the status of the scanner job checked by the operator in the print job management table 21i to "deleted", and deletes the corresponding image data (ST114).

If the operator clicks on a button corresponding to the manager function mode (ST113), the operational management controller 25 changes the manager function mode variable (ST115) and returns from the scanner job process. If a button corresponding to the function mode button area in FIG. 35 is clicked (ST113), the operational management controller 25 changes the mode variable (ST116) and returns.

In the manager agent basic setting process, the operational management controller 25 displays, as shown in FIG. 36 or 37, information of one basic setting management table 21f linked from the agent management table 21e such that the operator can set information (ST121), and waits for input from the operator (ST122). If a set button is clicked (ST133), the information set by the operator is written in the basic setting management table 21f (ST124). After that, the flow returns to step ST121.

If the operator clicks on a button corresponding to the manager function mode (ST123), the operational management controller 25 changes the manager function mode variable (ST125) and returns from the agent basic setting process. If a button corresponding to the function mode button area shown in FIG. 36 or 37 is clicked (ST123), the operational management controller 25 changes the mode variable (ST126) and returns.

If the operator switches functions (ST127), the operational management controller 25 selects a corresponding basic setting management table 21f (ST128) and returns to step ST121.

In the manager network setting process, the operational management controller 25 displays information of the network management table 21j as shown in FIG. 38 such that the operator can set information (ST131), and waits for input from the operator (ST132). If a set button is clicked (ST133), the information set by the operator is set in the network setting management table 21j (ST134). After that, the flow returns to step ST131.

If the operator clicks on a button corresponding to the manager function mode (ST133), the operational management controller 25 changes the manager function mode variable (ST135) and returns from the network setting process. If a button corresponding to the function mode button area shown in FIG. 38 is clicked (ST133), the operational management controller 25 changes the mode variable (ST136) and returns.

In the manager password setting process, the operational management controller 25 displays a window for inputting the manager password as shown in FIG. 39 (ST141) and waits for input from the operator (ST142). If a set button is clicked (ST143), the operational management controller 25 compares the password in the manager password management table 21a with the current password input by the operator (ST144). If the two passwords agree (ST145), the operational management controller 25 writes the new password input by the operator in the manager password management table 21a (ST146) and returns.

If the operator clicks on a button corresponding to the manager function mode (ST143), the operational management controller 25 changes the manager function mode variable (ST147) and returns from the manager password setting process. If a button corresponding to the function mode button area shown in FIG. 39 is clicked (ST143), the operational management controller 25 changes the mode variable (ST148) and returns.

As described above, when the window of a liquid crystal display as an operation unit of a digital copying machine is to be set from a remote place, an image in the same form as on the liquid crystal display of the digital copying machine is displayed on a display unit of an operational management client as a remote terminal. This allows an operator to readily check and change the settings of functions. Also, a new icon image can be easily added to the window. On a personal computer as the operational management client, instructions are input by clicking on icons like on general personal computers. This makes the input process identical with that when a built-in touch panel (i.e., a portion of the panel corresponding to an icon) of the liquid crystal display of the digital copying machine is clicked.

Additionally, in setting agent functions such as mail transmission and DB registration by assigning them to access buttons (icons) on the window, common settings of functions such as an SMTP server name in the case of mail transmission and access button inherent settings (e.g., addresses of mail transmission) are separately performed. Therefore, when an operator as the manager initially performs the common agent settings, the amount of work which each user performs in individual access button settings can be reduced. This simplifies the setting operation.

In displaying a print job list on the operational management client, normal printing and highly confidential printing are displayed so that an operator can distinguish between them. This makes more detailed management possible.

When an operator checks the settings of various functions on the operational management client, the use frequency of each frame or access button for operating a function is displayed. This is effective information when a frame or access button displayed on the window is to be changed.

When both common and private functions exist and the private function is to be referred to or changed to set a function on the operational management client, a password used to operate the digital copying machine is checked. This can ensure the security.

In the above embodiment, when the window of a liquid crystal display as an operation unit of a digital copying machine is to be set from a remote place, an image in the same form as on the liquid crystal display of the digital copying machine is displayed on a display unit of an operational management client as a remote terminal. However, it is also possible to share only the settings of a window used on the remote terminal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing system comprising an image processor for processing an image and a remote terminal connected to said image processor via a communication line to manage an operation of said image processor, wherein said remote terminal uses a window having a same form as that for designating a function on said image processor as a window for designating a function of said image processor, and said image processing system further comprises counting means provided in said image processor to count a number of times of use of each frame or icon used on the window for designating a function of said image processor, and display means provided in one of said remote terminal and said image processor to display, when the window for designating a function of said image processor is displayed, the number of times of use, counted by said counting means, of each frame or icon used on the window.

2. An image display method in an image processing system comprising an image processor for processing an image and a remote terminal connected to said image processor via a communication line to manage an operation of said image processor, comprising the steps of:

causing said remote terminal to display a window having a same form as that for designating a function on said image processor as a window for designating a function of said image processor;

causing said image processor to count a number of times of use of each frame or icon displayed on the window for designating a function of said image processor; and causing one of said remote terminal and said image processor to display, when the window for designating a function of said image processor is displayed, the number of times of use, counted by the counting step, of each frame or icon displayed on the window.

* * * * *